(12) United States Patent
Mercx et al.

(10) Patent No.: US 12,459,244 B2
(45) Date of Patent: Nov. 4, 2025

(54) MOLDED PARTS WITH REDUCED MICROWAVE REFLECTIONS AND TRANSMISSION

(71) Applicant: SHPP GLOBAL TECHNOLOGIES B.V., Bergen op Zoom (NL)

(72) Inventors: Franciscus Petrus Maria Mercx, Bergen op Zoom (NL); Yapeng Fang, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/832,977

(22) PCT Filed: Jan. 23, 2023

(86) PCT No.: PCT/IB2023/050545
§ 371 (c)(1),
(2) Date: Jul. 25, 2024

(87) PCT Pub. No.: WO2023/144679
PCT Pub. Date: Aug. 3, 2023

(65) Prior Publication Data
US 2025/0100258 A1    Mar. 27, 2025

(30) Foreign Application Priority Data

Jan. 26, 2022   (EP) .................................. 22153476

(51) Int. Cl.
*B32B 27/20*   (2006.01)
*B32B 7/02*   (2019.01)
(Continued)

(52) U.S. Cl.
CPC ................ *B32B 27/20* (2013.01); *B32B 7/02* (2013.01); *B32B 7/12* (2013.01); *B32B 27/065* (2013.01);
(Continued)

(58) Field of Classification Search
CPC .. B32B 27/20; B32B 7/02; B32B 7/12; B32B 27/065; B32B 27/308; B32B 27/36;
(Continued)

(56) References Cited

U.S. PATENT DOCUMENTS 4,923,736 A    5/1990   Hiza et al.
7,511,653 B2   3/2009   Yu et al.
(Continued)

FOREIGN PATENT DOCUMENTS

CN   111572109 B   10/2020
WO   2010/101822 A1   9/2010
(Continued)

OTHER PUBLICATIONS

Espacenet translation of WO-2018124131-A1 (Year: 2024).*
(Continued)

*Primary Examiner* — Michael Zhang
(74) *Attorney, Agent, or Firm* — Quicker Law, LLC

(57) ABSTRACT

Disclosed herein is a multilayer part comprising: a first layer, wherein the first layer comprises a first polymer composition comprising a first polymer and from about 0.1 wt. % to about 30 wt. % of a first electrically conductive carbon-based filler; a second layer disposed adjacent a surface of the first layer, wherein the second layer comprises a second polymer composition comprising a second polymer and from about 0.01 wt. % to about 10 wt. % of a second electrically conductive carbon-based filler; wherein the multilayer part exhibits a percent reflected power measured in transmission mode of less than 15% when observed according to a Free Space method at frequencies of from about 75 GHz to 110 GHz, when the multilayer part is oriented such that microwave radiation is incident to the second layer of the multilayer part.

11 Claims, 18 Drawing Sheets

(51) Int. Cl.
*B32B 7/12* (2006.01)
*B32B 27/06* (2006.01)
*B32B 27/30* (2006.01)
*B32B 27/36* (2006.01)

(52) U.S. Cl.
CPC ............ *B32B 27/308* (2013.01); *B32B 27/36* (2013.01); *B32B 2264/108* (2013.01); *B32B 2307/202* (2013.01); *B32B 2307/204* (2013.01); *B32B 2307/7376* (2023.05)

(58) Field of Classification Search
CPC ........ B32B 2264/108; B32B 2307/202; B32B 2307/204; B32B 2307/7376
See application file for complete search history.

(56) References Cited

U.S. PATENT DOCUMENTS

| | | |
|---|---|---|
| 8,662,449 B2 | 3/2014 | Shah et al. |
| 2019/0263097 A1 | 8/2019 | Chen et al. |
| 2021/0115220 A1 | 4/2021 | Rajagopalan et al. |
| 2022/0408618 A1* | 12/2022 | Matsui .................... B32B 25/16 |

FOREIGN PATENT DOCUMENTS

| | | | |
|---|---|---|---|
| WO | WO-2018124131 A1 * | 7/2018 | ............... H05K 9/00 |
| WO | 2020/127719 A1 | 6/2020 | |

OTHER PUBLICATIONS

Zainuri, M. et al. "The Effects of Layer Thickness of Radar Absorbing Materials Prepared by Double Layer Method on X-Band Wavelength Frequency", Materials Science Forum, vol. 966, 2019, pp. 35-40 (Abstract only).

Das, S. et al. "Microwave absorption properties of double layer radar absorbing materials based on doped hexaferrite TiO2/conducting carbon black", Journal of Engineering, vol. 2014, 2014, 5 pgs.

Mahanta, U. et al. "High-Performance Broadband Microwave Absorbers Using Multilayer Dual-Phase Dielectric Composites", Journal of Electric Materials, vol. 48, 2019, pp. 2438-2448 (Abstract only).

El-Hakim, H. et al. "Design of Compact Double-Layer Microwave Absorber for X-Ku Bands Using Genetic Algorithm" Progress In Electromagnetics Research B, vol. 65, 2016, pp. 157-168.

Kaur, R. et al. "Review on Microwave Absorbing Material using Different Carbon Composites" International Journal of Engineering Research & Technology (IJERT), vol. 3 Issue 5, 2014, pp. 160-167.

International Search Report and Written Opinion mailed Mar. 24, 2023 in PCT/IB2023/050545 (12 pgs.).

\* cited by examiner

Table 3A. Configuration of multilayer parts prepared

| | Part F | Part G | Part H |
|---|---|---|---|
| Layer A | 2.41 mm<br>10% CCB /PBT | 2.41 mm<br>10% CCB /PBT | 2.41 mm<br>10% CCB/PBT |
| Layer B | 50 micron;<br>3M™ 300LSE acrylate film | 50 micron;<br>3M™ 300LSE acrylate film | 25 micron;<br>Pyralux™ LF0100 acrylate film |
| Layer C | 0.55 mm<br>2% CB-13% GF PBT | 0.55 mm<br>1.33% CB-8.5% GF-PBT | 0.55 mm<br>1.33% CB-8.5% GF-PBT |

FIG. 3A

Table 3B

| Component | unit | Formulation | | |
|---|---|---|---|---|
| | | 1.33% CB-8.5%GF-PBT | 2% CB- 13%GF PBT | 10% CB-PBT |
| PBT-1 (VALOX 195-1001) | % | 52.33 | 49.36 | 37.37 |
| PBT-3 (VALOX 315-1001) | % | 37.34 | 35.30 | 52.63 |
| Carbon Black (ENSACO™ 360G Carbon Powder) | % | 1.33 | 2.00 | 10.00 |
| Antioxidant (Irganox 1010) | % | 0.04 | 0.04 | |
| Release (Pentaerythritol tetrastearate) | % | 0.30 | 0.30 | |
| GF (PPG 3540) | % | 8.66 | 13.00 | |
| total | % | 100 | 100 | 100 |

FIG. 3B

ELECTROMAGNETIC WAVE PROPAGATION IN THE ADAS

For Materials

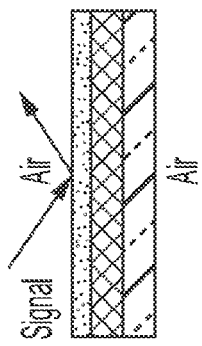

$E = E \cdot e^{-K \cdot r} = e^{-(\alpha + i\beta)d}$ $K = \omega \sqrt{\varepsilon_0 \mu_0 \varepsilon_r} = \alpha + i \cdot \beta$ $\varepsilon_r = \varepsilon_r' - i \cdot \varepsilon_r''$ $\alpha = \frac{1}{\lambda} \sqrt{\frac{\varepsilon_r'}{2} \left( \sqrt{1 + \left(\frac{\varepsilon_r''}{\varepsilon_r'}\right)^2} - 1 \right)}$ $\beta = \frac{1}{\lambda} \sqrt{\frac{\varepsilon_r'}{2} \left( \sqrt{1 + \left(\frac{\varepsilon_r''}{\varepsilon_r'}\right)^2} + 1 \right)}$

For single layer parts

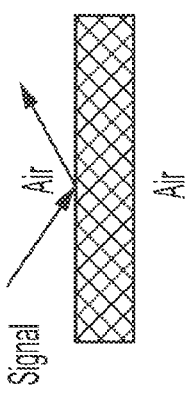

$Z_{in} = Z \dfrac{(Z_0 + Z)e^{(\alpha + i\beta)d} + (Z_0 - Z)e^{-(\alpha + i\beta)d}}{(Z_0 + Z)e^{(\alpha + i\beta)d} - (Z_0 - Z)e^{-(\alpha + i\beta)d}}$ Air impedance: $Z_0 = \sqrt{\dfrac{\mu_0}{\varepsilon_0}}$ Material impedance: $Z = \sqrt{\dfrac{\mu_0 \mu}{\varepsilon_0 \varepsilon}}$

For multilayer / mu-cellfoamed parts

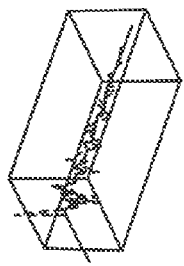

$Z_{in1} = Z_1 \dfrac{(Z_0 + Z_1)e^{(\alpha_1 + i\beta_1)d_1} + (Z_0 - Z_1)e^{-(\alpha_1 + i\beta_1)d_1}}{(Z_0 + Z_1)e^{(\alpha_1 + i\beta_1)d_1} - (Z_0 - Z_1)e^{-(\alpha_1 + i\beta_1)d_1}}$ $Z_{in2} = Z_2 \dfrac{(Z_{in1} + Z_2)e^{(\alpha_2 + i\beta_2)d_2} + (Z_{in1} - Z_2)e^{-(\alpha_2 + i\beta_2)d_2}}{(Z_{in1} + Z_2)e^{(\alpha_2 + i\beta_2)d_2} - (Z_{in1} - Z_2)e^{-(\alpha_2 + i\beta_2)d_2}}$

...

Layer impedance: $Z_i = \sqrt{\dfrac{\mu_0 \mu_i}{\varepsilon_0 \varepsilon_i}}$

FIG. 5

Table 5.

| Material | thickness (mm) | e' | e" | Df | Measured | | | Calculated | | |
|---|---|---|---|---|---|---|---|---|---|---|
| | | | | | S11 | S21 | Abs | S11 | S21 | Ab |
| 30% GF PBT | 2 | 3.455 | 0.040 | 0.012 | 2.57% | 90.58% | 6.85% | 3.20% | 90.24% | 6.56% |
| 30% GF PBT/PC | 3 | 2.734 | 0.062 | 0.023 | 18.28% | 67.80% | 13.92% | 18.20% | 68.17% | 13.64% |
| 2% CB/PBT | 3.1 | 4.181 | 0.424 | 0.101 | 13.94% | 27.76% | 58.30% | 13.60% | 30.68% | 55.72% |
| 4% CB/PBT | 3.1 | 5.918 | 1.297 | 0.219 | 18.66% | 5.00% | 76.34% | 16.57% | 5.90% | 77.54% |
| 6% CB/PBT | 3.1 | 7.955 | 2.624 | 0.330 | 25.00% | 0.67% | 74.33% | 24.63% | 0.76% | 74.60% |
| 8% CB/PBT | 3.1 | 9.858 | 4.032 | 0.409 | 28.34% | 0.11% | 71.55% | 28.99% | 0.13% | 70.88% |
| 10% CB/PBT | 3.1 | 11.758 | 6.318 | 0.537 | 32.30% | 0.01% | 67.70% | 33.89% | 0.01% | 66.11% |
| 14.5% CB/PBT | 3.1 | 15.654 | 12.266 | 0.784 | 42.49% | 0.00% | 57.51% | 42.49% | 0.00% | 57.51% |
| 2% CNT/PA66 | 3.95 | 6.545 | 0.825 | 0.126 | 18.31% | 10.51% | 71.19% | 19.91% | 10.04% | 70.05% |
| 4% CNT/PA66 | 3.95 | 11.085 | 2.480 | 0.224 | 29.62% | 0.63% | 69.75% | 29.83% | 0.67% | 69.50% |

FIG. 6

Table 6. Theoretical calculated and measured radar absorption data for a three-layer part

| | Calculated | | | Measured | | |
|---|---|---|---|---|---|---|
| | S11 | S21 | Ab | S11 | S21 | Ab |
| sample F (C) | 9.71% | 0.06% | 90.22% | 13.80% | 0.02% | 86.18% |
| sample F (A) | 33.91% | 0.05% | 66.04% | 31.50% | 0.02% | 68.48% |
| Sample G (C) | 10.39% | 0.07% | 89.54% | 7.55% | 0.02% | 92.43% |
| Sample G (A) | 33.88% | 0.05% | 66.07% | 31.40% | 0.02% | 68.58% |
| Sample H (C) | 7.60% | 0.07% | 92.33% | 6.25% | 0.01% | 93.74% |
| Sample H (A) | 33.88% | 0.05% | 66.07% | 32.20% | 0.01% | 67.79% |

F (C), G (C), H (C), lower Dk, Df layer C facing radar emitter
F (A), G(A), H (A), higher Dk, Df layer A facing radar emitter
For sample build up see Table 2

FIG. 7

Table 7. Calculated radar characteristics (at 77 GHz) of dual layer

| Top layer | | Bottom layer | | Thickness | | | Radar characteristics | | |
|---|---|---|---|---|---|---|---|---|---|
| e' | e" | e' | e" | Top layer | Bottom layer | Total | reflection | transmission | absorption |
| 2.9 | 0.01 | 11.758 | 6.318 | 0 | 3 | 3 | 33.89% | 0.01% | 66.10% |
| | | | | 0.1 | 2.9 | 3 | 30.46% | 0.01% | 69.53% |
| | | | | 0.2 | 2.8 | 3 | 23.75% | 0.02% | 76.23% |
| | | | | 0.3 | 2.7 | 3 | 14.70% | 0.03% | 85.27% |
| | | | | 0.4 | 2.6 | 3 | 5.99% | 0.04% | 93.96% |
| | | | | 0.5 | 2.5 | 3 | 1.87% | 0.06% | 98.07% |
| | | | | 0.6 | 2.4 | 3 | 4.88% | 0.08% | 95.04% |
| | | | | 0.7 | 2.3 | 3 | 13.03% | 0.10% | 86.87% |
| | | | | 0.8 | 2.2 | 3 | 22.11% | 0.12% | 77.77% |
| | | | | 0.9 | 2.1 | 3 | 29.22% | 0.14% | 70.63% |
| | | | | 1 | 2 | 3 | 33.26% | 0.18% | 66.56% |
| | | | | 0 | 2 | 2 | 33.99% | 0.21% | 65.80% |
| | | | | 0.1 | 1.9 | 2 | 30.61% | 0.25% | 69.13% |
| | | | | 0.2 | 1.8 | 2 | 23.92% | 0.37% | 75.70% |
| | | | | 0.3 | 1.7 | 2 | 14.69% | 0.56% | 84.75% |
| | | | | 0.4 | 1.6 | 2 | 5.78% | 0.84% | 93.39% |
| | | | | 0.5 | 1.5 | 2 | 1.83% | 1.17% | 97.00% |
| | | | | 0.6 | 1.4 | 2 | 5.28% | 1.51% | 93.21% |
| | | | | 0.7 | 1.3 | 2 | 13.26% | 1.86% | 84.88% |
| | | | | 0.8 | 1.2 | 2 | 21.32% | 2.26% | 76.42% |
| | | | | 0.9 | 1.1 | 2 | 27.55% | 2.80% | 69.65% |
| | | | | 0 | 1.5 | 1.5 | 34.06% | 0.88% | 65.06% |
| | | | | 0.1 | 1.4 | 1.5 | 31.36% | 1.22% | 67.41% |
| | | | | 0.2 | 1.3 | 1.5 | 25.02% | 1.78% | 73.20% |
| | | | | 0.3 | 1.2 | 1.5 | 15.41% | 2.68% | 81.92% |
| | | | | 0.4 | 1.1 | 1.5 | 5.71% | 3.97% | 90.32% |
| | | | | 0.5 | 1 | 1.5 | 1.72% | 5.52% | 92.76% |
| | | | | 0.6 | 0.9 | 1.5 | 5.88% | 7.04% | 87.09% |
| | | | | 0.7 | 0.8 | 1.5 | 13.09% | 8.65% | 78.26% |
| | | | | 0.8 | 0.7 | 1.5 | 17.73% | 10.91% | 71.36% |
| | | | | 0.9 | 0.6 | 1.5 | 20.17% | 14.10% | 65.73% |
| | | | | 1 | 0.5 | 1.5 | 27.30% | 17.10% | 55.60% |
| | | | | 1 | 1 | 2 | 32.37% | 3.50% | 64.13% |
| | | | | 0.1 | 0.9 | 1 | 31.89% | 4.78% | 63.33% |
| | | | | 0.2 | 0.8 | 1 | 27.98% | 6.78% | 65.24% |
| | | | | 0.3 | 0.7 | 1 | 18.36% | 10.32% | 71.32% |
| | | | | 0.4 | 0.6 | 1 | 5.32% | 16.06% | 78.62% |
| | | | | 0.5 | 0.5 | 1 | 0.52% | 22.64% | 76.84% |
| | | | | 0.6 | 0.4 | 1 | 14.09% | 26.24% | 59.67% |
| | | | | 0.7 | 0.3 | 1 | 30.06% | 28.67% | 41.28% |
| | | | | 0.8 | 0.2 | 1 | 31.46% | 37.69% | 30.84% |
| | | | | 0.9 | 0.1 | 1 | 16.21% | 61.84% | 21.95% |

FIG. 8

Table 8. Possible solutions for multilayer parts with reflections <15% and transmission <6% for different combinations of first and second layers with a total thickness of 2mm

| Top layer | | Bottom layer | | | | | | | | | | | | |
|---|---|---|---|---|---|---|---|---|---|---|---|---|---|---|
| | | Dk=6 | | Dk=8 | | Dk=10 | | | | | Dk=12 | | Dk=15 | |
| Dk | Df | Df=0.08 | Df=0.4 | Df=0.08 | Df=0.4 | Df=0.08 | Df=0.3 | Df=0.35 | Df=0.4 | Df=0.25 | Df=0.4 | Df=0.8 | Df=0.25 | Df=0.8 |
| 2 | 0.001 | N | N | N | Y | N | N | N | Y | N | Y | Y | N | N |
| 2 | 0.02 | N | N | N | Y | N | N | N | Y | N | Y | Y | N | N |
| 3 | 0.001 | N | Y | N | Y | N | N | Y | Y | N | Y | Y | N | Y |
| 3 | 0.02 | N | Y | N | Y | N | Y | Y | Y | N | Y | Y | N | Y |
| 4 | 0.015 | N | Y | N | Y | N | Y | Y | Y | N | Y | Y | N | Y |
| 4 | 0.1 | N | Y | N | Y | N | Y | Y | Y | N | Y | Y | Y | Y |
| 5 | 0.015 | N | Y | N | Y | N | Y | Y | Y | N | Y | Y | N | Y |
| 5 | 0.2 | N | Y | N | Y | N | Y | Y | Y | Y | Y | Y | Y | Y |

Y = possible solution
N = no possible solution

FIG. 10

MOLDED PARTS WITH REDUCED MICROWAVE REFLECTIONS AND TRANSMISSION

CROSS-REFERENCE TO RELATED APPLICATION

This application is the National Stage of International Application No. PCT/IB2023/050545 filed Jan. 23, 2023, which claims priority to and the benefit of European Application No. 22153476.1 filed Jan. 26, 2022, the disclosures of which are incorporated herein by this reference in their entireties.

FIELD OF THE DISCLOSURE

The present disclosure relates to radar absorbing materials, particularly layered materials configured for absorbing microwave radiation.

BACKGROUND OF THE DISCLOSURE

Radar absorbing materials (RAM) are widely used to shield radar wave transmission and attenuate side waves that may cause ghost (reflect) images that trigger false actions or alarms. As such, low reflectivity of a RAM material is beneficial because the lower reflectivity may increase sensor accuracy. A higher absorption may be needed to ensure that signals are effectively attenuated and shield against reflections of chassis parts that may create ghost images. Absorption occurs when the electromagnetic field/photons interact and transfer energy to the substance/material they are striking instead of transmitting through or reflecting it. Ferromagnetic and carbon-based fillers are generally used in designing electro-magnetic absorption compounds, with many of today's RAM materials being based on carbon-based compounds. For carbon-based compounds, a well percolated carbon network providing high electrical conductivity may provide good shielding performance. Moreover, the higher the conductivity the better the attenuation of electro-magnetic waves and the lower the transmission of the RAM. However, for reflection, the opposite occurs at lower conductivities leading to lower reflection of the radar waves. As such, most conventional RAMs either favor transmission or reflection. Aspects of the present disclosure address these and other needs.

SUMMARY

The above-described and other deficiencies of the art are met by a multilayer part comprising a first layer, wherein the first layer comprises a first polymer composition comprising a first polymer and from about 0.1 wt. % to about 20 wt. % of a first electrically conductive carbon-based filler; a second layer disposed adjacent a surface of the first layer, wherein the second layer comprises a second polymer composition comprising a second polymer and from about 0.01 wt. % to about 10 wt. % of a second electrically conductive carbon-based filler; wherein the multilayer part exhibits a percent reflected power measured in transmission mode of less than 15% when observed according to a Free Space method at frequencies of from about 75 gigahertz GHz to 110 GHz when the multilayer part is oriented such that microwave radiation is incident to the second layer of the multilayer part, and wherein the combined weight percent value of all components does not exceed 100 wt. %, and all weight percent values are based on the total weight of the first or second polymer composition. The above described and other features are exemplified by the following detailed description, examples, and claims.

BRIEF DESCRIPTION OF THE FIGURES

The accompanying figures, which are incorporated in and constitute a part of this specification, illustrate several aspects and together with the description serve to explain the principles of the disclosure.

FIG. 3A presents Table 3A showing the configuration of multilayer parts F, G, and H prepared. FIG. 3B presents Table 3B showing the formulations of multilayer parts F, G, and H configuration.

FIG. 5 is a depiction of the calculations for determining electromagnetic wave propagation in ADAS sensors.

FIG. 6 presents Table 5 showing the theoretical calculated and measured radar absorption data for a single material.

FIG. 7 presents Table 6 showing the theoretical calculated and measured radar absorption data for a three-layer part.

FIG. 8 presents Table 7 showing the calculated radar characteristics at 77 GHz for a dual layer part.

FIG. 10 presents Table 8 showing the multilayer calculations for different combinations of first and second/third layer.

DETAILED DESCRIPTION

Figure 1:
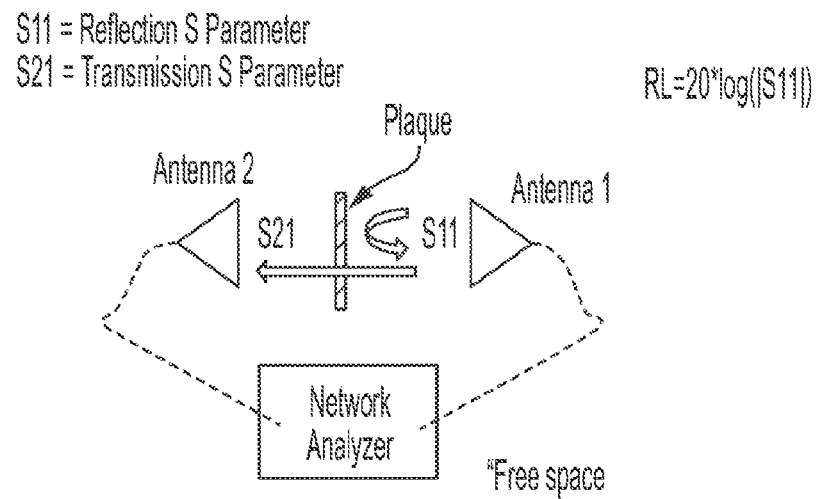
FIG. 1 presents a diagram of the transmission mode of the Free Space Method for determining the scattering parameters from which the dielectric constant $\varepsilon'$ (Dk) and dissipation loss $\varepsilon''$ (Df) are calculated.

Radar absorbing materials (RAM) desirably have a low-reflectivity (to increases sensor accuracy) and a high absorption (to effectively attenuate signals and shield against reflections of chassis parts that may create ghost images). Conventional RAM materials are carbon-based compounds, but these materials favor more absorption or favor lower reflection. Manufacturers of radar materials thus either accept the flaws of the current materials or parts or attempt to mitigate the negative effects using software or use less conductive materials. With less conductive materials, reflection can be reduced to 10-20% but sufficient shielding may only be achieved in molded parts that are at least 3 millimeters (mm) thick.

It is thus desirable to achieve a single product featuring these conflicting performances of absorption and reflectivity. Aspects of the present disclosure provide compositions for molded parts combining low-reflectivity and high absorbing characteristics for microwaves. Such materials may be useful for applications in external or internal radar absorbing parts. The disclosure may combinate a first layer material having high Dk and dissipation factor DF with a second layer material having low Dk values. The disclosed molded parts may feature a combination of two materials each with specific conductive characteristics that may reconcile these conflicting requirements into a single product.

Aspects of the present disclosure define the material characteristics and thicknesses to provide a molded part that may surpass the performance of molded parts formed from conventional single use materials with respect to reflective and/or absorption or shielding properties. According to various aspects, the molded part may be described as a multilayer part formed from the disclosed compositions may comprise one or more electrically conductive carbon-based fillers. The multilayer part may comprise multiple discrete layers, such as a first layer and a second layer, each layer comprising a respective polymer composition as described herein. As an example, the multilayer part may comprise a first layer comprising a first composition and a second layer comprising a second composition. The first layer may have a thickness greater than 0.8 mm while the second layer may have a thickness from about 0.2 mm to about 0.7 mm. The multilayered part may have a reflectivity less than 15%, and a transmission less than 3%, when measured in an orientation such that the second layer is toward the incident microwave irradiation.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Various combinations of elements of this disclosure are encompassed by this disclosure, for example, combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of embodiments described in the specification.

Multilayer Part

A multilayer part formed from the disclosed compositions may comprise one or more electrically conductive carbon-based fillers. The multilayer part may comprise multiple discrete layers, such as a first layer and a second layer, each layer comprising a respective polymer composition as described herein. As an example, the multilayer part may comprise a first layer comprising a first composition and a second layer comprising a second composition. Aspects of the disclosure relate to a multilayer part configured for improved microwave radiation absorption. It is well known that reflectivity is determined by several factors but mainly determined by the Dk (E') of the material and lower Dk materials have in general lower reflectivity. For reduced transmission a higher conductive material is typically preferred. Therefore, combining a low conductive material as a first layer with a high conductive material as a backing or second layer may be an optimal best route towards meeting low reflective and high absorbing (low-transmission) materials.

The multilayer part may comprise at least a first layer and a second layer. The multilayer part may exhibit a percent reflected power measured in transmission mode of less than 15% and a transmission less than 6% when observed according to a Free Space method at frequencies of from about 77 GHz to 81 GHz when the multilayer part is oriented such that microwave radiation is incident to the second layer of the multilayer part.

In certain aspects, the first layer and the second layer may be joined by an intervening third layer comprising an adhesive such that the adhesive is disposed between the first layer and the second layer. The adhesive may comprise an acrylate. The intervening third layer may have a thickness of from about 10 microns to about 100 microns. Each layer of the multilayer part may have a particular thickness and said thicknesses of each layer may be relative to one another. The first layer may have a thickness of greater than 0.8 mm. The second layer may have a thickness from about 0.2 mm to about 0.7 mm. In some examples, a ratio of a thickness of the first layer to the second layer may be from about 1:2 to 1:5 (or a ratio in thicknesses of about 0.5 to 1.5 or from about 0.6 to 1.2 or from about 0.6 to 1.5 or from about 0.4 to 1.5 or from about 0.4 to 1.2).

Each layer of the multilayer part may exhibit particular dielectric properties. For example, each layer may exhibit a particular dielectric constant. According to various aspects, a dielectric constant (Dk) of the 2nd layer may be from about 2 to 5 when measured using a split post dielectric resonator (SPDR) and network analyzer at fixed frequencies (about 77 GHz to 81 GHz) or at 77 GHz. In further aspects, discrete layers of the multilayer part may exhibit certain dielectric properties in relation to one another. As an example, a ratio of a Dk of the second layer to a Dk of the first layer ($Dk_{2nd\ layer}/Dk_{1st\ layer}$) may be from 0.2 to 0.6 or from about 0.1 to 1 or from about 0.2 to 1, or from about 0.1 to 6, when tested on molded samples of the first polymer of the first layer and the second polymer of the second layer respectively using a split post dielectric resonator (SPDR) and network analyzer at fixed frequencies. In a specific example, the $Dk_{2nd\ layer}/Dk_{1st\ layer}$ is from about 0.2 to 0.6. According to various aspects, the respective layers may exhibit a sufficiently low dissipation factor Df when measured using a split post dielectric resonator (SPDR) and network analyzer at fixed frequencies (about 77 GHz to 81 GHz) or at 77 GHz. The dissipation factor may be less than 0.1 for each layer where the multilayer part has a reflection less than 15% and transmission less than 6%.

Polymer Compositions

In an aspect, the first layer comprises a first polymer composition comprising a first polymer and from about 0.1 wt. % to about 20 wt. % of a first electrically conductive carbon-based filler. The second layer may comprise a second polymer composition comprising a second polymer and from about 0.01 wt. % to about 10 wt. % of a second electrically conductive carbon-based filler. In some examples, the first and second polymers are the same polymer. In further aspects, the first and second polymers may comprise different polymers. The first polymer or second polymer may comprise a polyester, a polycarbonate, a polyamide, a polyphenylene ether, or a combination thereof.

In further aspects, the first or second polymer may comprise a polycarbonate. As used herein, "polycarbonate" refers to an oligomer or polymer comprising residues of one or more dihydroxy compounds, for example, dihydroxy aromatic compounds, joined by carbonate linkages; it also encompasses homopolycarbonates, copolycarbonates, and (co) polyester carbonates. The terms "residues" and "structural units", used in reference to the constituents of the polymers, are synonymous throughout the specification. In various aspects, the polycarbonate may comprise a bisphenol A based polycarbonate.

The terms "BisA," "BPA," or "bisphenol A," which can be used interchangeably, as used herein refers to a compound having a structure represented by the formula:

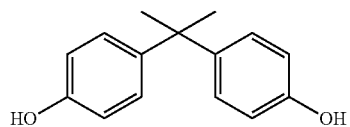 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

In certain aspects, the polycarbonate polymer is a Bisphenol-A polycarbonate, a high molecular weight (Mw) high flow/ductile (HFD) polycarbonate (PC), a low Mw HFD polycarbonate, or a combination thereof. For example, the high flow/ductile polycarbonate may be a polycarbonate that provides very high flow (for example, about 40%  greater than conventional polycarbonate), while maintaining the toughness and ductility for flowability that is typical in conventional polycarbonate. Examples of high flow/ductile polycarbonates suitable for use in aspects of the present disclosure include the LEXAN™ HFD line of polycarbonates, available from SABIC. For a given melt flow, LEXAN™ HFD polymer has about a 10-15° C. lower ductile/brittle transition temperature than conventional PC. In addition, LEXAN™ HFD polymer exhibits high ductility at temperatures down to about −40° F. (−40° C.), and processes at temperatures about 20° F. (20° C.) lower than conventional PC having the same ductility.

An example of a bisphenol-A polycarbonate suitable for use in aspects of the disclosure includes, but is not limited to, a PC copolymer (various grades of which are available from SABIC), which includes repeating units derived from BPA and repeating units derived from sebacic acid. In a further aspect, the polycarbonate polymer could be a Bisphenol-A polycarbonate homopolymer, or a blend of the PC Copolymer and the Bisphenol-A polycarbonate homopolymer.

More specifically, a suitable polycarbonate copolymer may comprise repeating units derived from sebacic acid and BPA. Useful polycarbonate copolymers are commercially available and include, but are not limited to, those marketed under the trade names LEXAN™ EXL and LEXAN™ HFD polymers available from SABIC™. The mechanism for the sebacic acid-based may proceed as shown below.

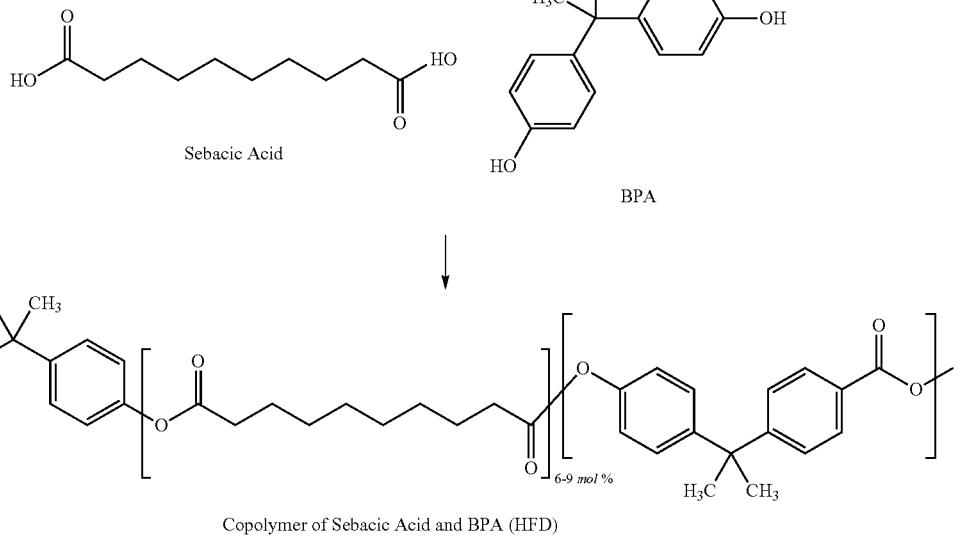

Copolymer of Sebacic Acid and BPA (HFD)

The sebacic acid based PC may provide improved flow and ductility as well as lower processing times while the BPA provides desirable heat performance and modulus properties to provide a copolymer of sebacic acid and BPA. An example of the sebacic acid PC may comprise LEXAN™ HFD resin available from SABIC. The polymer component thus may comprise a poly(aliphatic ester)-polycarbonate copolymer comprising soft block aliphatic dicarboxylic acid ester units.

As used herein, "high molecular weight" refers to a molecular weight (Mw) of about 58,000 to about 75,000 grams/mole (g/mol). As used herein, "low molecular weight" refers to a Mw of about 15,000 to about 58,000 g/mol, as measured by gel permeation chromatography using BPA polycarbonate standards.

In aspects of the disclosure the thermally conductive composition includes from about 20 wt. % to about 80 wt. % a polycarbonate polymer. In particular aspects the thermally conductive composition includes from about 25 wt. % to about 70 wt. % of a polycarbonate polymer, and in further aspects the thermally conductive composition includes from about 35 wt. % to about 65 wt. % a polycarbonate polymer, or even from about 35 wt. % to about 50 wt. % a polycarbonate polymer.

In various further aspects, "polycarbonates" and "polycarbonate resins" as used herein further include homopolycarbonates, copolymers including different $R^1$ moieties in the carbonate (referred to herein as "copolycarbonates"), copolymers including carbonate units and other types of polymer units, such as ester units, polysiloxane units, and combinations including at least one of homopolycarbonates and copolycarbonates. As used herein, "combination" is inclusive of blends, mixtures, alloys, reaction products, and the like.

Non-limiting examples of polysiloxane-polycarbonate copolymers can comprise various copolymers available from SABIC. In an aspect, the polysiloxane-polycarbonate copolymer can contain 6% by weight polysiloxane content based upon the total weight of the polysiloxane-polycarbonate copolymer. In various aspects, the 6% by weight polysiloxane block copolymer can have a weight average molecular weight (Mw) of from about 23,000 to 24,000 Daltons using gel permeation chromatography with a bisphenol A polycarbonate absolute molecular weight standard. In certain aspects, the 6% weight siloxane polysiloxane-polycarbonate copolymer can have a melt volume flow rate (MVR) of about 10 cubic centimeters per 10 minutes ($cm^3$/10 min.) at 300° C./1.2 kilograms kg (see C9030T, a 6% by weight polysiloxane content copolymer available from SABIC "transparent" EXL C9030T resin polymer). In another example, the polysiloxane-polycarbonate block can comprise 20% by weight polysiloxane based upon the total weight of the polysiloxane-polycarbonate block copolymer. For example, an appropriate polysiloxane-polycarbonate copolymer can be a bisphenol A polysiloxane-polycarbonate copolymer end-capped with para-cumyl phenol (PCP) and having a 20% polysiloxane content (see C9030P, commercially available from SABIC as the "opaque" EXL C9030P). In various aspects, the weight average molecular weight of the 20% polysiloxane block copolymer can be about 29,900 Daltons to about 31,000 Daltons when tested according to a polycarbonate standard using gel permeation chromatography (GPC) on a cross-linked styrene-divinylbenzene column and calibrated to polycarbonate references using a UV-VIS detector set at 264 nanometer (nm) on 1 milligrams per milliliter (mg/ml) samples eluted at a flow rate of about 1.0 ml/minute. Moreover, the 20% polysiloxane block copolymer can have a melt volume rate (MVR) at 300° C./1.2 kg of 7 $cm^3$/10 min and can exhibit siloxane domains sized in a range of from about 5 micron to about 20 micrometers (microns, μm).

As provided herein, the thermoplastic composition may comprise a blend of polycarbonate and polyester polymers or a polycarbonate-polyester copolymer.

In further aspects, the first or second polymer may comprise a polyester. For example, the thermoplastic composition may comprise a polyalkylene ester (a polyester), such as a polyalkylene terephthalate polymer.

Polyesters have repeating units of the following formula (A):

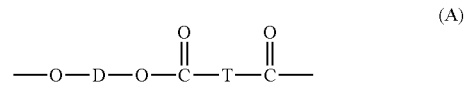

wherein T is a residue derived from a terephthalic acid or chemical equivalent thereof, and D is a residue derived from polymerization of an ethylene glycol, butylene diol, specifically 1,4-butane diol, or chemical equivalent thereof. Chemical equivalents of diacids include dialkyl esters, for example, dimethyl esters, diaryl esters, anhydrides, salts, acid chlorides, acid bromides, and the like. Chemical equivalents of ethylene diol and butylene diol include esters, such as dialkylesters, diaryl esters, and the like. In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions. Poly (alkylene arylates) can have a polyester structure according to formula (A), wherein T comprises groups derived from aromatic dicarboxylates, cycloaliphatic dicarboxylic acids, or derivatives thereof.

Examples of specifically useful T groups include, but are not limited to, 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene.

Examples of polyalkylene terephthalate include polyethylene terephthalate (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations including at least one of the foregoing polyesters may also be used.

Copolymers including alkylene terephtalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of poly(ethylene terephthalate), and abbreviated as PCTG where the polymer comprises greater than 50 mol % of poly(1,4-cyclohexanedimethylene terephthalate). Poly(cycloalkylene diester) s can also include poly(alkylene cyclohexanedicarboxylate)s. Of these, a specific example is poly(1,4-cyclohexane-dimethanol-1,4-cyclohexanedicarboxylate) (PCCD), having recurring units of formula (B):

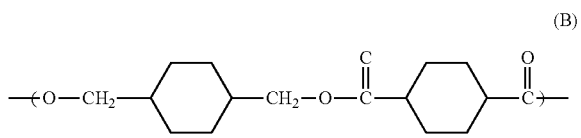

(B)

wherein, as described using formula (A), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

In another aspect, the composition can further comprise poly(1,4-butylene terephthalate) or "PBT" resin. PBT may be obtained by polymerizing a glycol component of which at least 70 mol %, preferably at least 80 mol %, consists of tetramethylene glycol and an acid or ester component of which at least 70 mol %, preferably at least 80 mol %, consists of terephthalic acid and/or polyester-forming derivatives thereof. Commercial examples of PBT include those available under the trade names VALOX™ 315, VALOX™ 195 and VALOX™ 176, manufactured by SABIC™, having an intrinsic viscosity of 0.1 deciliters per gram (dl/g) to about 2.0 dl/g (or 0.1 dl/g to 2 dl/g) as measured in a 60:40 phenol/tetrachloroethane mixture or similar solvent at 23 degrees Celsius (° C.) to 30° C. In one aspect, the PBT resin has an intrinsic viscosity of 0.1 dl/g to 1.4 dl/g (or about 0.1 dl/g to about 1.4 dl/g), specifically 0.4 dl/g to 1.4 dl/g (or about 0.4 dl/g to about 1.4 dl/g).

Certain aspects of the composition include from about 50 wt. % to about 99 wt. % of a thermoplastic resin, or from about 40 wt. % to about 97 wt. % of a polymer base resin, or from about 55 wt. % to about 97 wt. % of a polymer base resin, or from about 60 wt. % to about 97 wt. % of a polymer base resin, or from about 70 wt. % to about 97 wt. % of a polymer base resin, or from about 40 wt. % to about 95 wt. % of a polymer base resin, or from about 55 wt. % to about 95 wt. % of a polymer base resin, or from about 60 wt. % to about 95 wt. % of a polymer base resin, or from about 75 wt. % to about 97 wt. % of a polymer base resin.

Conductive Carbon Filler

Compositions disclosed herein may comprise an electrically conductive filler. Suitable electrically conductive fillers may include carbon-based or non-carbon-based fillers such as particulate interstitial carbides, and metallic nanoparticles (gold, silver, copper, $Fe_2O_3$, for example). In various aspects, the composition comprises an electrically conductive carbon-based filler such as conductive carbon black. Generally, carbon-based fillers may comprise carbon fibers, carbon powder, graphite, graphene, carbon platelets, or carbon nanotubes. In various aspects, the composition comprises conductive carbon black or carbon-nanotubes, carbon-based fillers.

Carbon black may refer to an amorphous form of carbon with a high surface-area-to-volume ratio. Further, carbon black may include a chemisorbed oxygen complex (such as, carboxylic, quinonic, lactonic, phenolic groups and the like) on its surface to varying degrees, depending on the conditions of manufacture. Carbon black properties such as particle size, structure, and purity may vary depending on the type of carbon black chosen. In one aspect, carbon black can disperse well within the polymer phase, maintain the integrity of its structure or network, and have a consistent particle size. According to certain aspects of the present disclosure, however, the conductive carbon black does not refer to carbon black for colorant purposes.

In one example, the conductive carbon black is an electrically conductive carbon black. The conductive carbon black may be furnace black or acetylene black or an extra conductive carbon black. Conductive carbon black such as furnace black or acetylene black may have a high conductivity as evidenced by a volume resistivity within a range of from 1 to $10^{-2}$ ohms·centimeters (Ω-cm) (0.01 to 1 Ω-cm, this range value may be considered a low volume resistivity). Useful conductive carbon black of the present disclosure may exhibit a BET (Brunauer, Emmett and Teller) specific surface area of about at least 50 meters squared per gram ($m^2/g$) to about 1500 $m^2/g$. In another aspect, the conductive carbon black powder may exhibit an oil absorption number (OAN) from about at least 100 milliliters (ml)/100 gram (g) or at least 150 ml/100 g. In further aspects, the carbon based filler, such as carbon black, may have a specific conductivity. For example, the carbon-based filler may have a conductivity of at least In a specific aspect, the electrically conductive carbon black comprises an ENSACO™ 250 G carbon powder, available from or Imerys Graphite & Carbon Switzerland. In some aspects, the thermoplastic composition may comprise an electrically conductive carbon black having at least one dimension of a particular size. The electrically conductive carbon black may comprise a powder having a particular particle size distribution. For example, the carbon-based filler may have at least one dimension that is less than 100 nm. However, these particles may agglomerate together to have a certain structure and increased aggregate dimensions that may be at a micrometer scale in size.

In some aspects, the electrically conductive carbon black may have a particular diameter. For example, the electrically conductive carbon black may have a primary particle diameter of 10 nanometers to 50 nm. In a yet further aspect, the electrically conductive carbon black may have a DBP absorption amount from about 80 milliliters per 100 grams (ml/100 g) to about 500 ml/100 g.

In some aspects, the composition can comprise from about 0.5 wt. % to about 30 wt. % of an electrically conductive carbon black based on the total weight of the thermoplastic composition. The ratio of the polymer component to electrically conductive carbon black may be from about 32:1 to about 6:1 or from about 24:1 to about 6:1. In further aspects the composition may include from about 0.1 wt. % to about 30 wt. %, or from 0.1 wt. % to about 25 wt. %, 0.5 wt. % to about 25 wt. %, or from about 0.5 wt. % to about 20 wt. %, or from about 1 wt. % to about 20 wt. %, or from about 3 wt. % to about 30 wt. %, or from about 2 wt. % to about 25 wt. % of an electrically conductive carbon black, or from about 10 wt. % to about 25 wt. % of an electrically conductive carbon black or from about 8 wt. % to about 25 wt. % of an electrically conductive carbon black.

A multilayer part formed from the disclosed compositions may comprise one or more electrically conductive carbon-based fillers. The multilayer part may comprise multiple discrete layers, such as a first layer and a second layer, each layer comprising a respective polymer composition as described herein. As an example, the multilayer part may comprise a first layer comprising a first composition and a second layer comprising a second composition. In one example, the multilayer part may comprise a first polymer composition comprising a first electrically conductive carbon-based filler and a second polymer composition comprising a second electrically conductive carbon-based filler. The first and second electrically conductive carbon-based filler may be in distinct layers of a multilayer part prepared according to aspects of the present disclosure. As an example, a first layer of the multilayer part may comprise a first electrically conductive carbon-based filler and a second layer of the multilayer part may comprise a second electrically conductive carbon-based filler, and so forth.

The first and second electrically conductive carbon-based fillers may be present in a particular amount. For example, the first electrically conductive carbon-based filler may be present in an amount of from about 0.1 wt. % to about 30 wt. %, or from 0.5 wt. % to about 25 wt. %, or from about 0.5 wt. % to about 20 wt. %, or from about 1 wt. % to about 20 wt. %, or from about 3 wt. % to about 30 wt. %, or from about 2 wt. % to about 25 wt. %, or from about 0.1 wt. % to about 12 wt. %, or from about 0.1 wt. % to about 15 wt. %, or from about 1 wt. % to about 12 wt. %, or from about 1 wt. % to about 12 wt. %, or from about 0.1 wt. % to about 8 wt. %, or from about 0.1 wt. % to about 5 wt. %, or from about 0.1 wt. % to about 3 wt. %, or from about 0.01 wt. % to about 8 wt. %, or from about 0.01 wt. % to about 5 wt. %, or from about 0.01 wt. % to about 3 wt. % based on the total weight of the composition. The second electrically conductive carbon-based filler may be present in an amount of from about 0.1 wt. % to about 20 wt. %, or from 0.01 wt. % to about 10 wt. %, or from about 0.5 wt. % to about 15 wt. %, or from about 1 wt. % to about 12 wt. %, or from about 3 wt. % to about 12 wt. %, or from about 2 wt. % to about 15 wt. %, or from about 0.1 wt. % to about 12 wt. %, or from about 0.1 wt. % to about 15 wt. %, or from about 1 wt. % to about 12 wt. %, or from about 1 wt. % to about 12 wt. %, or from about 0.1 wt. % to about 8 wt. %, or from about 0.1 wt. % to about 5 wt. %, or from about 0.1 wt. % to about 3 wt. %, or from about 0.01 wt. % to about 8 wt. %, or from about 0.01 wt. % to about 5 wt. %, or from about 0.01 wt. % to about 3 wt. % based on the total weight of the composition.

Additional Additives

In certain aspects, conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composition mixture. Exemplary additives can include ultraviolet agents, ultraviolet stabilizers, heat stabilizers, antistatic agents, impact modifiers, anti-microbial agents, anti-drip agents, radiation stabilizers, pigments, dyes, fibers, fillers, plasticizers, fibers, flame retardants, antioxidants, lubricants, wood, glass, and metals, and combinations thereof. According to certain aspects, the polymer compositions may maintain mechanical performance and dielectric properties even with high levels of fillers (for example, greater than 30 wt. % filler based on the total weight of the polymer composition).

The composition disclosed herein can comprise one or more additional fillers. The filler can be selected to impart additional impact strength and/or provide additional characteristics that can be based on the final selected characteristics of the polymer composition. In some aspects, the filler(s) can comprise inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers. In certain aspects, the composition may comprise a glass fiber filler. For example, the composition may comprise from about 0.01 wt. % to about 25 wt. %, from about 10 wt. % to about 25 wt. %, from about 15 wt. % to about 25 wt. %, of a glass fiber filler based on the total weight of the composition. In yet further aspects, the composition may be free or substantially free of a glass filler.

In some aspects, the thermoplastic composition may comprise a synergist. In various examples fillers may serve as flame retardant synergists. The synergist facilitates an improvement in the flame retardant properties when added to the flame retardant composition over a comparative composition that contains all of the same ingredients in the same quantities except for the synergist. Examples of mineral fillers that may serve as synergists are mica, talc, calcium carbonate, dolomite, wollastonite, barium sulfate, silica, kaolin, feldspar, barytes, or the like, or a combination comprising at least one of the foregoing mineral fillers. Metal synergists, for example, antimony oxide, can also be used with the flame retardant. In one example, the synergist may comprise magnesium hydroxide and phosphoric acid. The mineral filler may have an average particle size of about 0.1 to about 20 micrometers, specifically about 0.5 to about 10 micrometers, and more specifically about 1 to about 3 micrometers.

The thermoplastic composition can comprise an antioxidant. The antioxidants can include either a primary or a secondary antioxidant. For example, antioxidants can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants can generally be used in amounts of from 0.01 to 0.5 parts by weight, based on 100 parts by weight of the total composition, excluding any filler.

In various aspects, the thermoplastic composition can comprise a mold release agent. Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from about 0.1 to about 1.0 parts by weight, based on 100 parts by weight of the total composition, excluding any filler.

In an aspect, the thermoplastic composition can comprise a heat stabilizer. As an example, heat stabilizers can include, for example, organo-phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can generally be used in amounts of from 0.01 to 0.5 parts by weight based on 100 parts by weight of the total composition, excluding any filler.

In further aspects, light stabilizers can be present in the thermoplastic composition. Exemplary light stabilizers can include, for example, benzotriazoles such as 2-(2-hydroxy-5-methylphenyl) benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers can generally be used in amounts of from about 0.1 to about 1.0 parts by weight, based on 100 parts by weight of the total composition, excluding any filler. The thermoplastic composition can also comprise plasticizers. For example, plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler.

Ultraviolet (UV) absorbers can also be present in the disclosed thermoplastic composition. Exemplary ultraviolet absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[[(2-cyano-3,3-diphenylacryloyl)oxy]-2,2-bis[[(2-cyano-3, 3-diphenylacryloyl) oxy]methyl]propane (UVINUL™ 3030); 2,2'-(1,4-phenylene) bis (4H-3,1-benzoxazin-4-one); 1,3-bis[(2-cyano-3, 3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

The thermoplastic composition can further comprise a lubricant. As an example, lubricants can include for example, fatty acid esters such as alkyl stearyl esters, for example, methyl stearate or the like; mixtures of methyl stearate and hydrophilic and hydrophobic surfactants including polyethylene glycol polymers, polypropylene glycol polymers, and copolymers thereof for example, methyl stearate and polyethylene-polypropylene glycol copolymers in a suitable solvent; or combinations including at least one of the foregoing lubricants. Lubricants can generally be used in amounts of from about 0.1 to about 5 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. In one example, TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. An antidrip agent, such as TSAN, can be used in amounts of 0.1 to 10 parts by weight, based on 100 parts by weight of the total composition, excluding any filler.

As an example, the disclosed composition can comprise an impact modifier. The impact modifier can be a chemically reactive impact modifier. By definition, a chemically reactive impact modifier can have at least one reactive group such that when the impact modifier is added to a polymer composition, the impact properties of the composition (expressed in the values of the Izod impact) are improved. In some examples, the chemically reactive impact modifier can be an ethylene copolymer with reactive functional groups selected from, but not limited to, anhydride, carboxyl, hydroxyl, and epoxy.

In further aspects of the present disclosure, the composition can comprise a rubbery impact modifier. The rubber impact modifier can be a polymeric material which, at room temperature, is capable of recovering substantially in shape and size after removal of a force. However, the rubbery impact modifier should typically have a glass transition temperature of less than 0° C. In certain aspects, the glass transition temperature ($T_g$) can be less than −5° C., −10° C., −15° C., with a $T_g$ of less than −30° C. typically providing better performance. Representative rubbery impact modifiers can include, for example, functionalized polyolefin ethylene-acrylate terpolymers, such as ethylene-acrylic esters-maleic anhydride (MAH) or glycidyl methacrylate (GMA). The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step.

Properties and Articles

The multilayer part of the present disclosure achieves low reflection (less than 25%) and low transmission (less than 6%, or less than 3%). In various aspects, reflection and absorption of microwaves may be dependent on both the conductivity as well as the frequency of the microwaves. The multilayer part of the present disclosure achieves low reflection (less than 25% or less than 15%) and low transmission (less than 6%, or less than 3%) at frequencies of about 77 GHz to 81 GHz.

A first layer of the multilayer part may have a thickness greater than 0.8 mm while the second layer may have a thickness from about 0.2 mm to about 0.7 mm. The multilayered part may have a reflectivity less than 15%, specifically less than 10%, or less than 8%, or less than 6%, and a transmission less than 3% or less than 2% or less than 1%, when measured in an orientation such that the second layer is toward the incident microwave irradiation. Given the foregoing properties, molded parts formed according to the present disclosure may be useful as external or internal radar absorbing parts. Radars are widely used in advanced driver assistance systems (ADAS) as it provides capabilities such as blind spot detection, collision avoidance, automatic braking, traffic alerts, and they can operate in conditions with poor visibility, like rain and mist, that impair LiDAR and camera functioning. In a specific example, the molded parts of the present disclosure may be components of ADAS.

In various aspects, the present disclosure relates to articles comprising the compositions herein. The compositions can be molded into useful shaped articles by a variety of means such as injection molding, extrusion, rotational molding, blow molding and thermoforming to form articles. The compositions can be useful in the manufacture of articles requiring materials with good flow, good impact strength, and good dielectric characteristics. In various aspects, the compositions may be useful for as well as electrically conducting purposes. The advantageous characteristics of the molded parts disclosed herein can make them appropriate for an array of uses including, for example, radar materials and ADAS.

Methods for Making the Compositions and Multilayer Part

Aspects of the disclosure further relate to methods for making a composition including a thermoplastic polymer component. In many aspects, the compositions can be prepared according to a variety of methods. The compositions of the present disclosure can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods can include, but is not limited to, co-rotating and counter-rotating extruders, single screw extruders, co-kneaders, disc-pack processors and various other types of extrusion equipment. In a further aspect, the extruder is a twin-screw extruder. In various further aspects, the composition can be processed in an extruder at temperatures from about 180° C. to about 350° C., particularly 250° C. to 300° C.

Methods may further comprise processing the composition to provide a plaque of a desired thickness. Plaques can be extruded, injection molded, compression molded or injection-compression molded, and may have a thickness between about 0.2 mm and 6 mm. Other processes could also be applied to the thin thermoplastic film, including but not limited to, lamination, co-extrusion, thermo-forming or hot pressing. In such aspects, further layers of other materials (for example, other thermoplastic polymer layers, metallic layers, etc.) could be combined with the composition.

In specific examples, the multilayer part may be formed via a process of 2K injection molding. In one possible embodiment of the method according to the invention is based on a variant of the conventional injection molding process, the two-component injection molding, called 2K process for short. 2K molding is a technique for producing an article with multiple layers of two or more different materials (for example, two or three layers of two different materials). 2K molding may therefore produce an article with layers having distinctive properties.

An advantage of 2K molding are the desirable physical properties of the distinct layers being maintained in the same step as the molding of the article. 2K molding is especially useful in articles which must be painted on more than one side. With the conductive layer within the article, all sides can be electrostatically painted without repeated conductive layer applications. 2K molding may be referred to as multi-component injection molding, particularly preferably by 2-component injection molding. Under the shaping process of extrusion according to the disclosure, the continuous production of plastic semifinished products, in particular of films, plates, tubes or profiles, understood. In the extrusion process, the so-called extruder, consisting of screw and cylinder, presses the plastic compound under pressure continuously through a molding tool. In practice, single-screw, twin-screw extruders or special types may be used.

Various combinations of elements of this disclosure are encompassed by this disclosure, for example, combinations of elements from dependent claims that depend upon the same independent claim.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a thermoplastic polymer component" includes mixtures of two or more thermoplastic polymer components. As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional processes" means that the additional processes can or cannot be included and that the description includes methods that both include and that do not include the additional processes.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound. A weight percent of a component, unless specifically stated to the contrary, is based on the total weight of the formulation or composition in which the component is included.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation is 100.

Unless otherwise stated to the contrary herein, all test standards are the most recent standard in effect at the time of filing this application. Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Aspects of the Disclosure

The present disclosure pertains to and includes at least the following aspects.

Aspect 1A. A multilayer part comprising: a first layer, wherein the first layer comprises a first polymer composition comprising a first polymer and from about 0.1 wt. % to about 30 wt. % of a first electrically conductive carbon-based filler; a second layer disposed adjacent a surface of the first layer, wherein the second layer comprises a second polymer composition comprising a second polymer and from about 0.01 wt. % to about 10 wt. % of a second electrically conductive carbon-based filler, wherein the multilayer part exhibits a percent reflected power measured in transmission mode of less than 15% and a percent transmitted power less than 6% when observed according to a Free Space method at frequencies of from about 77 GHz to 81 GHz when the multilayer part is oriented such that microwave radiation is incident to the second layer of the multilayer part, and wherein the combined weight percent value of all components does not exceed 100 wt. %, and all weight percent values are based on the total weight of the first or second polymer composition.

Aspect 1B. A multilayer part consisting essentially of: a first layer, wherein the first layer comprises a first polymer composition comprising a first polymer and from about 0.1 wt. % to about 30 wt. % of a first electrically conductive carbon-based filler; a second layer disposed adjacent a surface of the first layer, wherein the second layer comprises a second polymer composition comprising a second polymer and from about 0.01 wt. % to about 10 wt. % of a second electrically conductive carbon-based filler, wherein the multilayer part exhibits a percent reflected power measured in transmission mode of less than 15% and a percent transmitted power less than 6% when observed according to a Free Space method at frequencies of from about 77 GHz to 81 GHz when the multilayer part is oriented such that microwave radiation is incident to the second layer of the multilayer part, and wherein the combined weight percent value of all components does not exceed 100 wt. %, and all weight percent values are based on the total weight of the first or second polymer composition.

Aspect 1C. A multilayer part consisting of: a first layer, wherein the first layer comprises a first polymer composition comprising a first polymer and from about 0.1 wt. % to about 30 wt. % of a first electrically conductive carbon-based filler; a second layer disposed adjacent a surface of the first layer, wherein the second layer comprises a second polymer composition comprising a second polymer and from about 0.01 wt. % to about 10 wt. % of a second electrically conductive carbon-based filler, wherein the multilayer part exhibits a percent reflected power measured in transmission mode of less than 15% and a percent transmitted power less than 6% when observed according to a Free Space method at frequencies of from about 77 GHz to 81 GHz when the multilayer part is oriented such that microwave radiation is incident to the second layer of the multilayer part, and wherein the combined weight percent value of all components does not exceed 100 wt. %, and all weight percent values are based on the total weight of the first or second polymer composition.

Aspect 2. The multilayer part according to any one of aspects 1A-2, wherein the first layer and the second layer are joined by an intervening third layer comprising an adhesive such that the adhesive is disposed between the first layer and the second layer.

Aspect 3. The multilayer part according to aspect 2, wherein the adhesive comprises an acrylate.

Aspect 4. The multilayer part according to aspect 2, wherein the intervening third layer has a thickness of from about 10 microns to about 100 microns.

Aspect 5. The multilayer part according to any one of aspects 1-5, wherein the second layer has a thickness less than 0.8 mm.

Aspect 6. The multilayer part according to any one of aspects 1-4, wherein the second layer has a thickness of from about 0.2 mm to about 0.7 mm.

Aspect 7. The multilayer part according to any one of aspects 1-4, wherein the first layer has a thickness greater than 0.8 mm.

Aspect 8. The multilayer part according to any one of aspects 1-7, wherein the multilayer part has an overall thickness of less than 3.5 mm.

Aspect 9. The multilayer part according to any one of aspects 1-8, wherein a ratio of a thickness of the first layer to the second layer is from about 1:1 to 20:1.

Aspect 10. The multilayer part according to any one of aspects 1-9, wherein the dielectric constant (Dk) of the $2^{nd}$ layer is 2 to 5 and wherein the ratio of a Dk of the second layer to a Dk of the first layer ($Dk_{2nd\ layer}/Dk_{1stlayer}$) is from 0.2 to 0.6 when tested on molded samples of material 1 and 2 respectively using a split post dielectric resonator (SPDR) and network analyzer at fixed frequencies.

Aspect 11. The multilayer part according to any one of aspects 1-10, wherein the first polymer or second polymer comprises a polyester, a polycarbonate, a polyamide, a polyphenylene ether, a polypropylene, or a combination thereof.

Aspect 12. The multilayer part according to aspect 11, wherein the first polymer or the second polymer comprises a polyester.

Aspect 13. The multilayer part according to any one of the aspects 1-12, wherein the first polymer and the second polymer comprise the same polymer.

Aspect 14. The multilayer part according to any one of aspects 1-13, wherein the amount of the first electrically conductive carbon-based filler in the first layer is greater than the amount of the second electrically conductive carbon-based filler in the second layer.

Aspect 15. The multilayer part according to any one of aspects 1-14, wherein the first and second electrically conductive carbon-based filler comprises carbon fibers, carbon powder, graphite, graphene, carbon platelets, carbon nanotubes, or a combination thereof.

Aspect 16. The multilayer part according to any one of aspects 1-15, wherein the electrically conductive carbon-based filler has a conductivity of at least 1 Siemens/cm.

Aspect 17. The multilayer part according to any one of aspects 1-16, wherein the electrically conductive carbon-based filler comprises conductive carbon black.

Aspect 18. The multilayer part according to any one of aspects 1-16, wherein the electrically conductive carbon-based filler comprises conductive carbon nanotubes.

Aspect 19. The multilayer part according to any one of aspects 1-18, wherein one or more of the first or second polymer composition further comprises a reinforcing filler.

Aspect 20. The multilayer part according to any one of aspects 1-19, wherein the multilayer part is formed by a 2K injection molding process.

Aspect 21. An autoradar sensor comprising a multilayer part, the multilayer part comprising: a first layer, wherein the first layer comprises a first polymer composition comprising from about 0.1 wt. % to about 20 wt. % of a first electrically conductive carbon-based filler; and a second layer disposed adjacent a surface of the first layer, wherein the second layer comprises a polymer composition comprising a second polymer and from about 0.01 wt. % to about 10 wt. % of a second electrically conductive carbon-based filler, wherein the multilayer part exhibits a percent reflected power measured in transmission mode of less than 15% and a percent transmitted power less than 6% when observed according to a Free Space method at frequencies of from about 77 GHz to 81 GHz when the multilayer part is oriented such that microwave radiation is incident to the second layer of the multilayer part, and wherein the combined weight percent value of all components does not exceed 100 wt. %, and all weight percent values are based on the total weight of the first or second polymer composition.

Aspect 22. The multilayer part according to any one of aspects 1-20, wherein the ratio of a Dk of the second layer to a Dk of the first layer (Dk2nd layer/Dk1stlayer) is from 0.2 to 0.6 when tested on molded samples of the first polymer of the first layer and the second polymer of the second layer respectively using a split post dielectric resonator (SPDR) and network analyzer at 77 GHz.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (for example, amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of mixing conditions, for example, component concentrations, extruder design, feed rates, screw speeds, temperatures, pressures and other mixing ranges and conditions that can be used to optimize the product purity and yield obtained from the described process. Only reasonable and routine experimentation will be required to optimize such process conditions.

Scattering parameters were measured according to the free-space method in transmission mode using a split post dielectric resonator (SPDR) and network analyzer. This Vector Network Analyzer connected to 2 antennas to focus microwave energy at or through a slab of material at frequencies of 60-90 GHz. Reflection and transmission were directly calculated from the S11 and S21 scattering parameters. Absorption is directly related to the reflection and transmission and calculated as follows:

$$\%\ Absorption = 100 - \%\ Reflection - \%\ Transmission$$

Figure 2A:
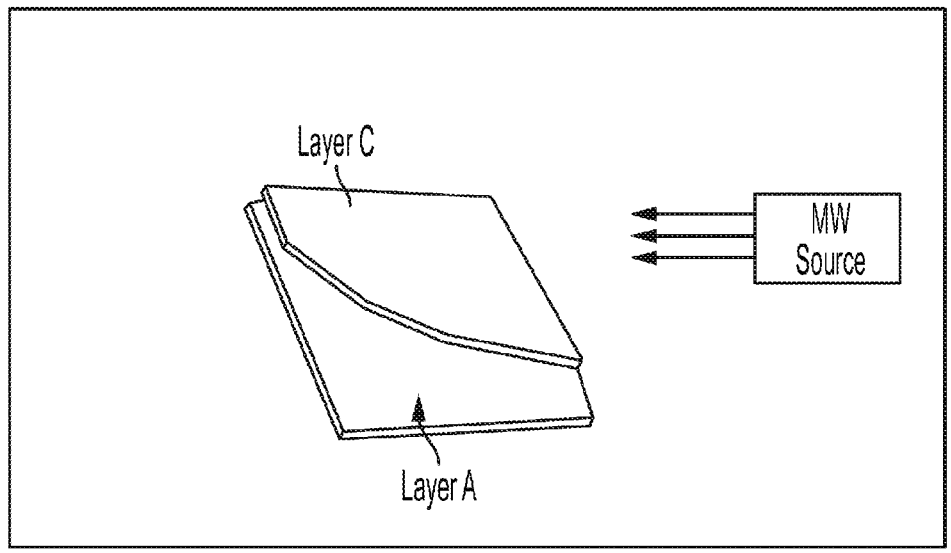
FIG. 2A is a diagram of the multilayer part oriented such that incident microwave radiation is directed at the second layer (layer C).
Figure 2B:
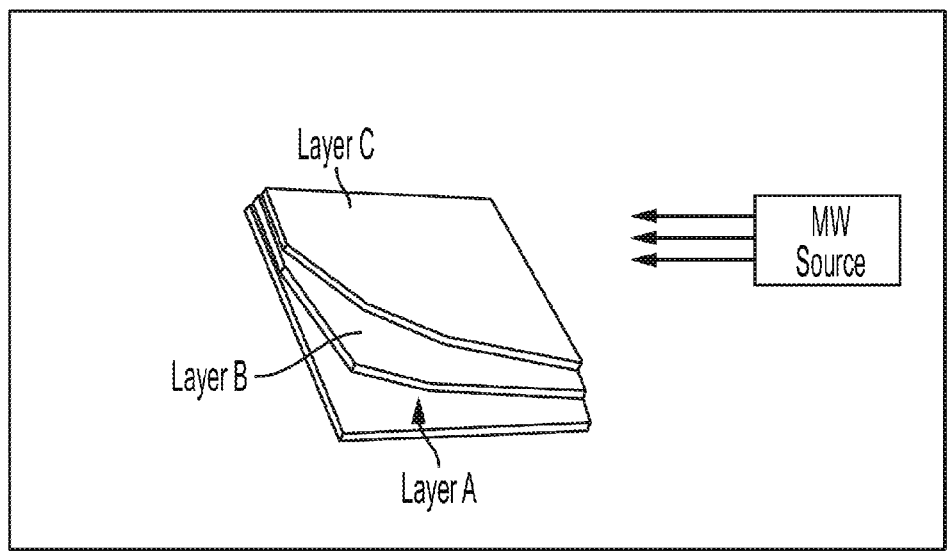
FIG. 2B is a diagram of the multilayer part with an intervening third layer (Layer B) oriented such that incident microwave radiation is directed at the second layer (layer C).

Transmission line theory was used to calculate the dielectric permittivities for single layer materials from the measured scattering parameters. Samples were evaluated in Transmission mode as presented in FIG. 1. FIG. 2A is a diagram of the multilayer part oriented such that the second layer (C) is oriented towards incident microwave radiation. FIG. 2B is a diagram of the multilayer part with an intervening third layer B oriented such that the third layer (B) or second layer (C) is oriented towards incident microwave radiation, unless specified otherwise.

Various compositions were prepared varying the carbon black CB loading in PBT. Formulations are presented in Table 1.

| | | Formulation | | | | | |
|---|---|---|---|---|---|---|---|
| Component | unit | 2% CB | 4% CB | 6% CB | 8% CB | 10% CB | 14.5% CB |
| PBT-1 (VALOX 195-1001) | % | 40.69 | 39.86 | 39.03 | 38.2 | 37.37 | 35.5 |
| PBT-2 (VALOX 315-1001) | % | 57.31 | 56.14 | 54.97 | 53.8 | 52.63 | 50 |
| Carbon Black (ENSACO™ 360G Carbon Powder) | % | 2 | 4 | 6 | 8 | 10 | 14.5 |
| total | % | 100 | 100 | 100 | 100 | 100 | 100 |

Table 2 shows the effect of carbon black (CB)-loaded PBT (formulations shown in Table 1) on the reflection, transmission and absorption at 77 GHz for 3.2 mm thick plaques. As can be inferred, increasing the CB loading increases both the Dk and Df. With increasing Dk, Df the amount of signal transmitted was reduced but at the same time the amount of reflection increased. Industry demand typically prefer materials with a reflection less 25%, preferably less than 15%, and a transmission value less than 6.5%, preferably less than 3%, to have sufficient shielding performance. At 4 wt. % CB, the 3.2 mm CB-loaded PBT would fulfil the minimum demand, but theoretical calculations using a model based on the principles disclosed herein established that at smaller wall thicknesses (less than 3.2 mm), the transmission decrease and does not meet the industry requirements. Conventional single material or single layer material thus did not meet balance of desired performance.

TABLE 2

Dielectric properties of 3.2 mm CB-PBT plaques at 77 GHz

| CB | $\varepsilon'$ | $\varepsilon''$ | $\varepsilon''/\varepsilon'$ (tan d) | Reflection (%) | Transmission (%) | Absorption (%) |
|---|---|---|---|---|---|---|
| 2 | 4.1811 | 0.4240 | 0.1014 | 13.94 | 27.76 | 58.30 |
| 4 | 5.9180 | 1.2971 | 0.2192 | 18.66 | 5.00 | 76.34 |
| 6 | 7.9550 | 2.6242 | 0.3299 | 25.00 | 0.67 | 74.33 |
| 8 | 9.8584 | 4.0318 | 0.4090 | 28.34 | 0.11 | 71.55 |
| 10 | 11.7580 | 6.3183 | 0.5374 | 32.30 | 0.01 | 67.70 |
| 14.5 | 15.6538 | 12.2659 | 0.7836 | 42.49 | 0 | 57.51 |

Compositions prepared in the present examples combined low and high-conductive materials to overcome these shortcomings and provided products with low reflection (specifically, less than 25%), high absorption (specifically, greater than 68.5% (% Absorption=100-% reflection-% transmitted, minimum amount for absorption corresponds to 100−25−6.5=68.5%)), and low transmission (specifically, less than 6.5%). For a first proof of principle, the following molded parts (F, G and H) (Tables 3A and 3B, shown in FIGS. 3A and 3B, respectively) were prepared using acrylate films (Layer B) to join two injection molded Layers A and C together.

Table 4 shows the properties $\varepsilon'$, $\varepsilon''$ and tan d of the materials used as measured on parts or in case of the acrylate films from the datasheet. Layer C had a much lower Dk/Df compared to layer A.

TABLE 4

Properties of materials used to prepare multilayer part.

| Material | $\varepsilon'$ | $\varepsilon''$ | $\varepsilon''/\varepsilon'$ (tan d) |
|---|---|---|---|
| 2.41 mm layer-10% CCB/PBT | 11.750 | 6.318 | 0.538 |
| 0.5 mm layer-2% CB-13% GF PBT | 4.170 | 0.250 | 0.060 |
| 0.55 mm layer-1.33% CB-8.5% GF-PBT | 3.797 | 0.187 | 0.049 |
| 50 micron layer-3M 300 LSE acrylate film* | 2.800 | 0.056 | 0.020 |
| 25 micron layer-Pyralux™ LF0100 acrylate film | 2.800 | 0.056 | 0.02 |

*No data available assumed to be the same as Pyralux™ film

Figure 4:
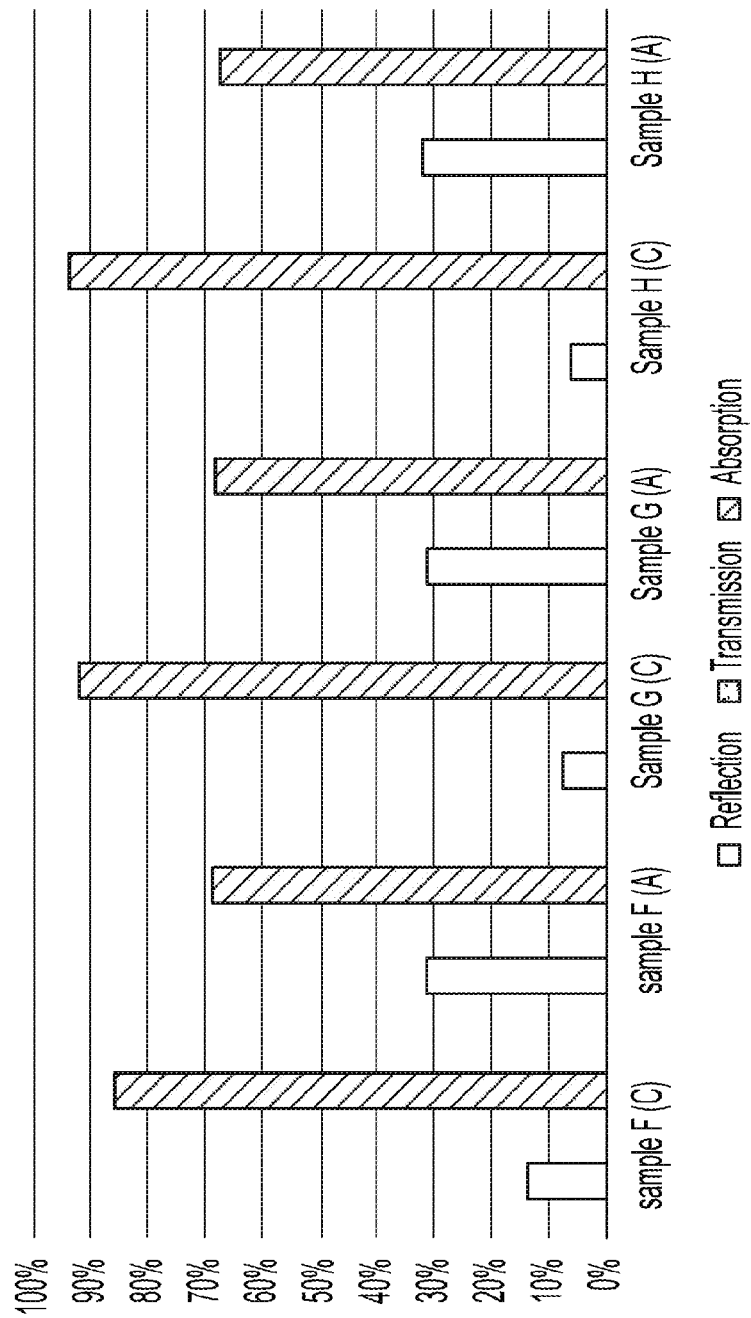
FIG. 4 is a graphical representation of the reflection, transmission and absorption for parts F, G, and H depending upon which layer is oriented towards the incident microwave radiation.

FIG. 4 shows that the inventive parts made showed both low-reflection and low transmission values when the low(er) Dk, Df layer C was facing the radar wave emitter samples F(C), G(C) and H(C). It also showed that when the high(er) Dk, Df layer A was facing the radar wave emitter (samples F(A), G(A) and H(A)) that reflections were significantly higher and well above 15%. Transmission values for these materials were virtually 0.

Modeling was used to further investigate and optimize sample thickness. Using the transmission line theory, the following formulas were derived for the single and multilayer models based on which an Excel program was developed for the calculations, allowing to calculate single layer, dual layer and triple layer materials over the thickness. Electromagnetic wave propagation in an advanced driver assistance systems (ADAS) was used for the model. The microwave propagation in the material is key for both radome design and absorber design in ADAS sensors. Calculations are shown in FIG. 5.

As can be inferred form Tables 5 (FIG. 6) and 6 (FIG. 7), there was a good alignment between the experimentally obtained and calculated data both for the single material (Table 5) and a three-layer stacked material (Table 6), showing that the model can be used for predictive calculations. The two-layer model was subsequently used to define the combinations that would provide a reflectivity of less than 15% and a transmission less than 6%, and preferably less than 3%.

Table 7 (shown in FIG. 8) shows the radar characteristics at 77 GHz for dual layers with different second layer thickness and different total thicknesses. The second layer here was a typical unreinforced PBT/PC material and the first layer (layer A) was a 10% CB filled PBT material. As can be inferred, a 0.3 mm to 0.7 mm thick second layer (layer C) of the PBT/PC material combined with the 10% CCB/PBT first layer (layer A) at 2 mm and 3 mm thickness provided a lower as 15% reflectivity with a transmission less than 6% and even less than 3%. It was apparent that reducing the thickness increased the transmission. This reduced the possible combinations at 1.5 mm thickness to a second layer (layer C) between 0.4 mm and 0.6 mm thickness to meet the desired properties, whereas at 1 mm overall thickness no solution was found.

Figure 9:
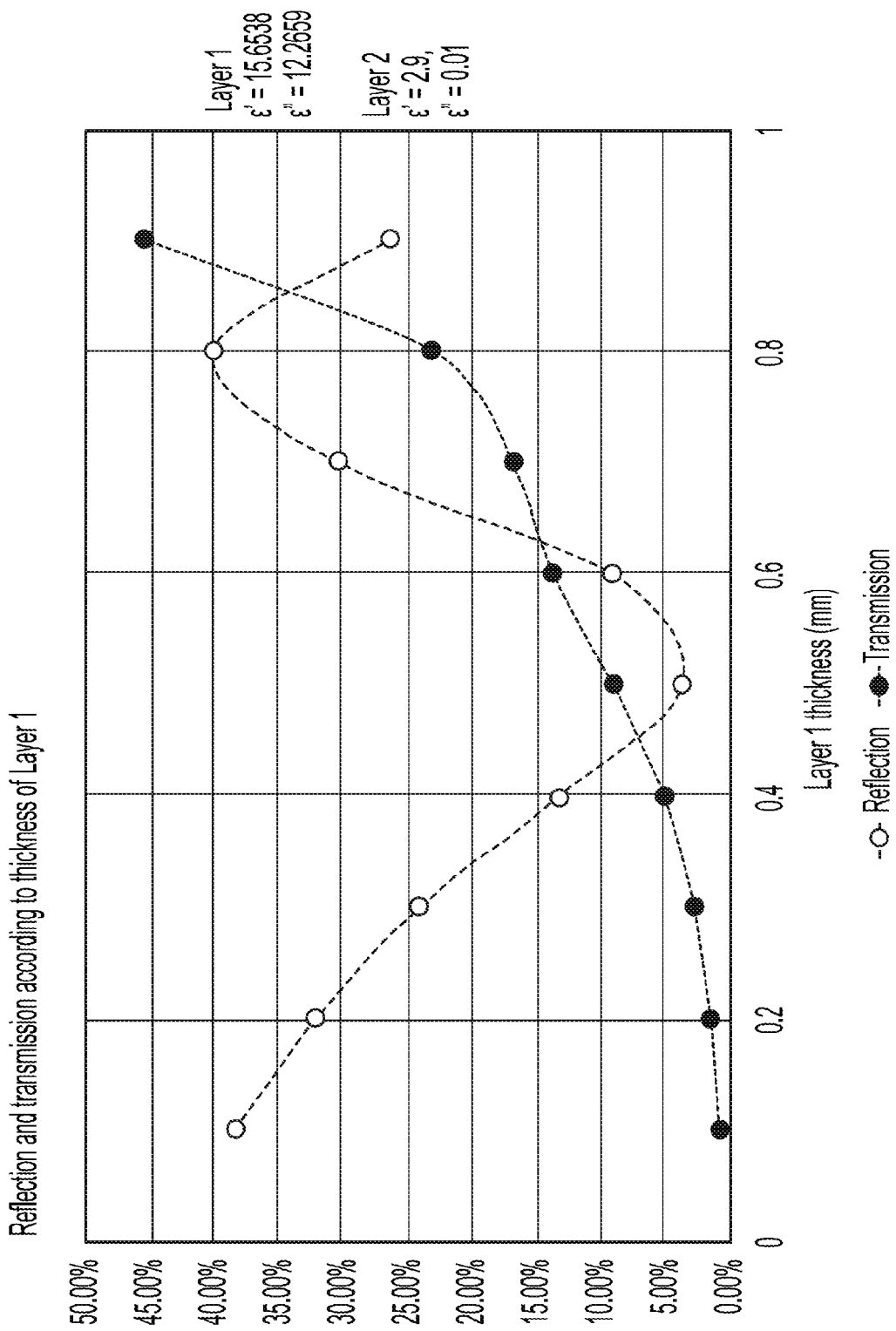
FIG. 9 is a graphical representation of the reflection and transmission as a function of the thickness of layer 1 in mm for a 1 mm thick dual layer system (layer 1 ($\varepsilon'$=15.6538, $\varepsilon''$=12.2659); layer 2 ($\varepsilon'$=2.9, $\varepsilon''$=0.01).

Increasing towards a higher ε' and ε", first layer (layer A) shows that it is now possible to find a solution with a 0.4 mm PBT/PC resin second layer (layer C) combined with 0.6 mm of a 14.5 wt % CCB/PBT first layer (ε'=15.6538, ε"=12.2659) (layer A) (FIG. 9). Theoretical calculations were performed to find combinations providing reflectivity less than 15% and transmission less than 6%. As most of the injection molded products had a wall thickness of 1.5 mm to 4 mm with most of the application between 2 mm to 3 mm in wall thickness, the main calculations varying the ε' and ε" for both the top and bottom layer were performed at 2 mm overall thickness representing a kind of worst case to meet the transmission requirements. Typically, the reflection seemed to vary with the Dk of the second layer (layer C) material and a reflection lower than 15% did not seem possible for materials having a Dk greater than 5. Hence, only materials having a Dk less than or equal to 5 were considered for the second layer (layer C). This was combined with materials (first layer/layer A) having a higher conductivity and preferably Df loss factor, for which materials with a Dk greater than or equal to 6 were considered.

Analyzing Dk, Df data for neat resins as well as CB-filled resins demonstrated the following: for materials having a Dk value from 2 to 3.5, the Df varied between 0.001 and 0.02. For materials having a Dk value from 3.5 to 4.5, the Df varied between 0.015 and 0.1. For materials having a Dk value from 4.5 to 5, the Df varied between 0.015 and 0.25, whereas for materials having a Dk value from 6 to 10, the Df varied from 0.08 to 0.4. For materials having a Dk greater than 10, the Df varied from 0.25 to above 1. Using these Dk and Df boundaries and in some cases intermediate Df values, calculations were performed with top layer (Layer C, FIG. 2A) materials having a Dk value ranging 2 to 5 combined with a bottom layer (Layer A, FIG. 2A) materials having a Dk between 6-15 (Table 8). Theoretical calculations for a 2 mm thick dual layer part were performed. The Dk of the first or top layer (Layer C) was from 2-5 and the second or bottom layer (Layer A) was from 6-15. The thickness of the top layer varied from 0.1 to 1 mm in discrete steps of 0.1 mm. Table 8 (FIG. 10) shows the outcome of these calculations for a part having an overall thickness of 2 mm where the first layer thickness was varied between 0.1 mm to 1 mm in discrete steps of 0.1 mm. For a system with a total thickness of 2 mm thickness, having a first layer of 1.6 mm thickness and a second layer of thickness of 0.4 mm, the ε" of the first layer vs. overall transmission of the dual layer system is plotted. An "N" indicated that no solution could be found meeting the requirements. If for a certain combination of Dk/Df materials, a solution could be found having a reflection less than 15% and a transmission less than 6%, the entry was indicated as "Y."

Figure 11A:
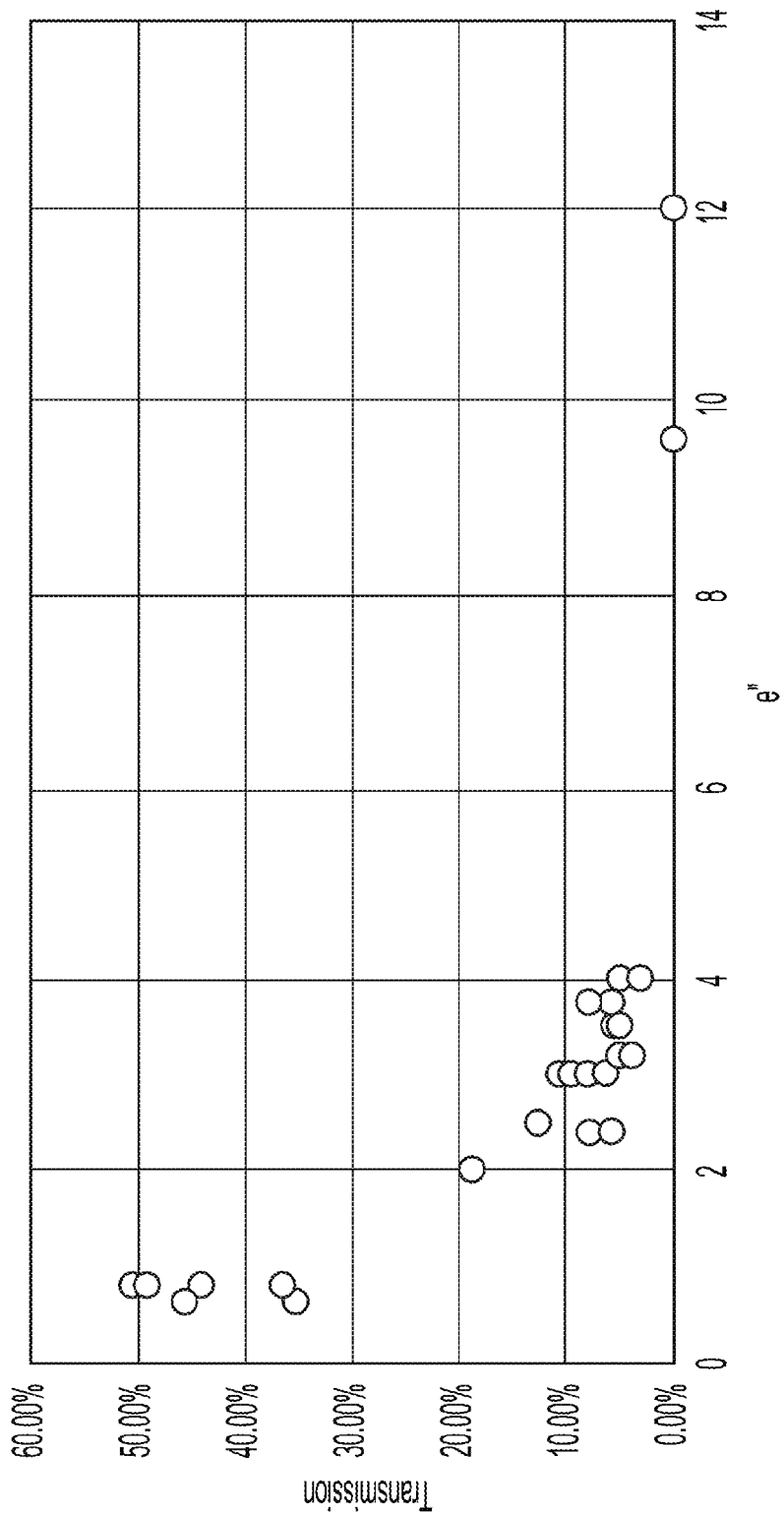
FIGS. 11A and 11B are a graphical representation of transmission for a dual layer system as a function of $\varepsilon''$ of the first layer for dual layer systems with a first layer thickness of 1.6 mm and a second layer thickness of 0.4 mm, where the Dk and Df of the first and second layer were varied.
Figure 11B:
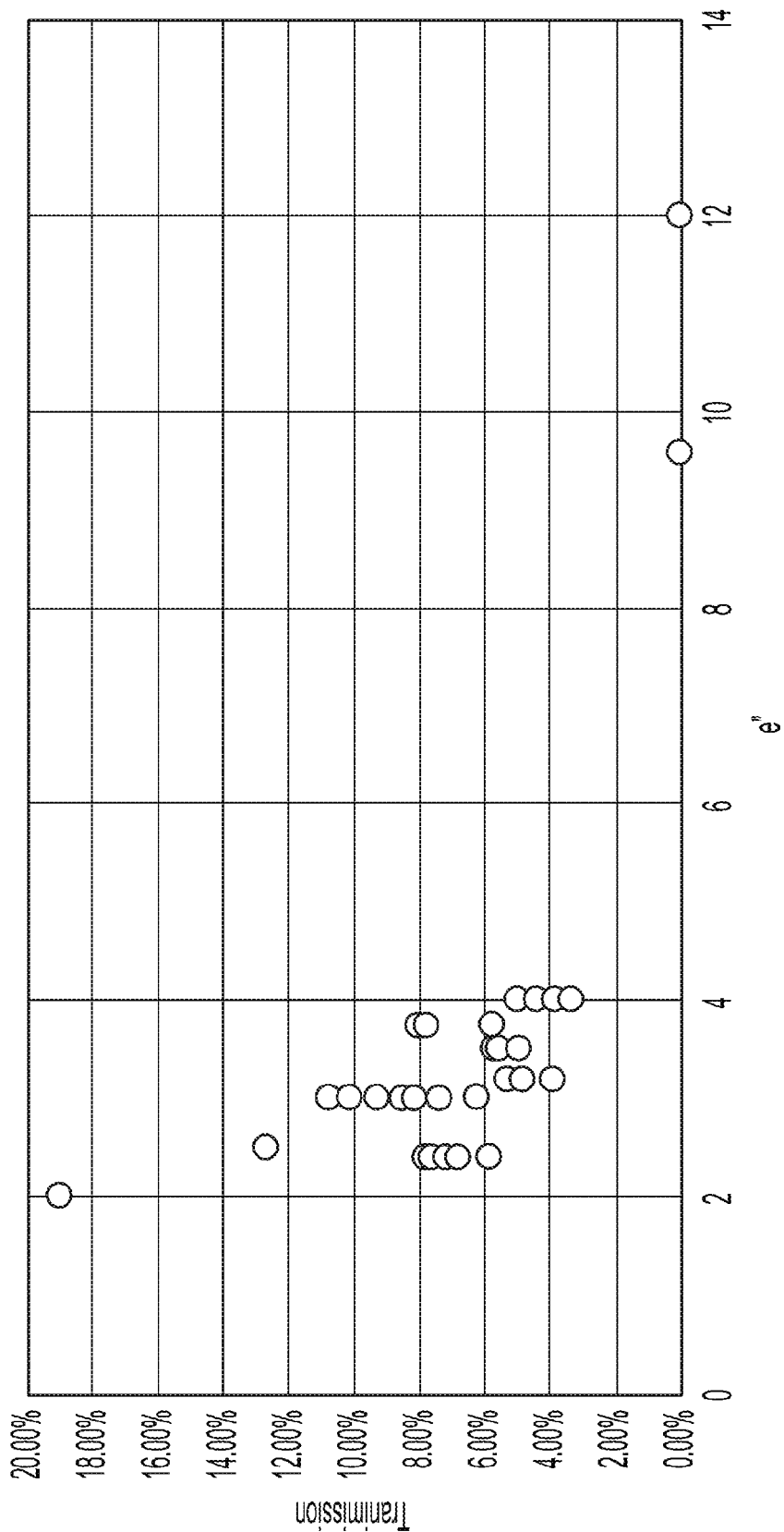
Figure 12A:
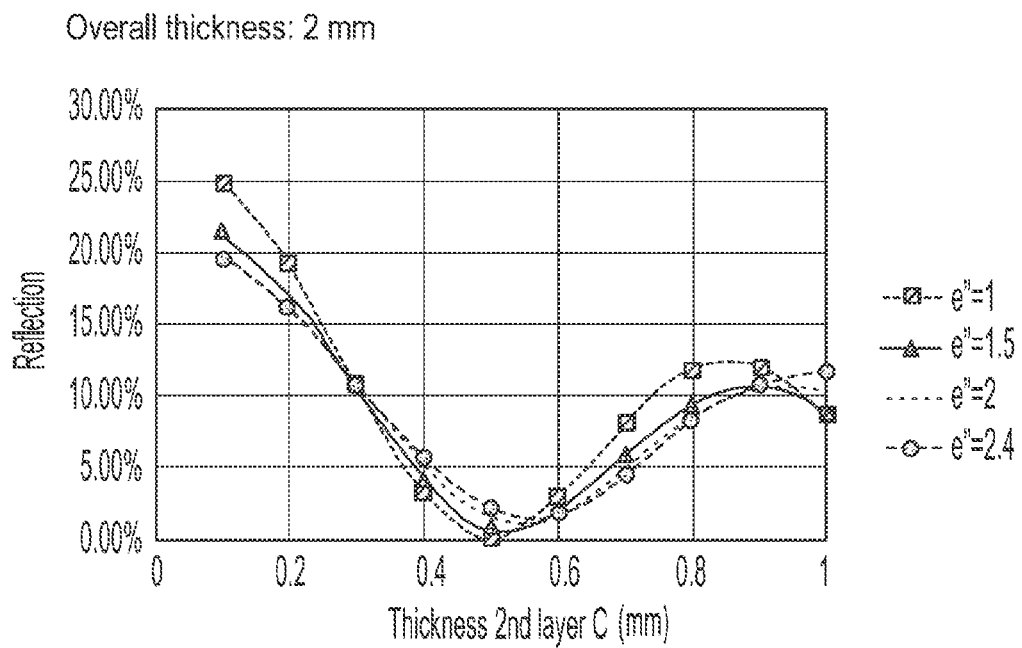
FIG. 12A-F Transmission and reflection as function of the top-layer thickness and $\varepsilon''$ of the bottom layer (top layer Dk at 2, Df at 0.001, bottom layer Dk at 6).
Figure 12B:
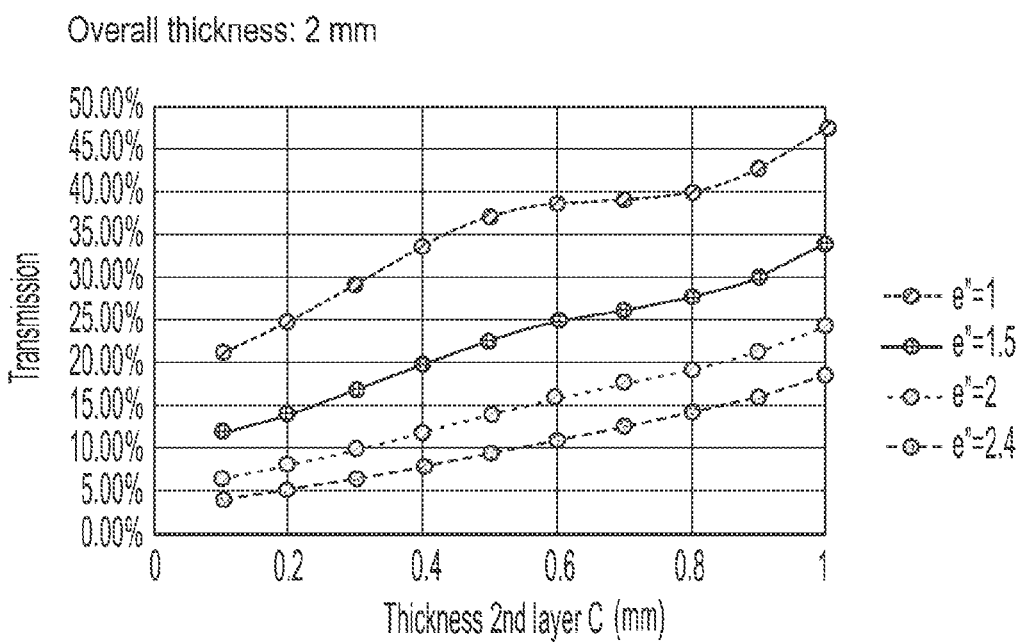
Figure 12C:
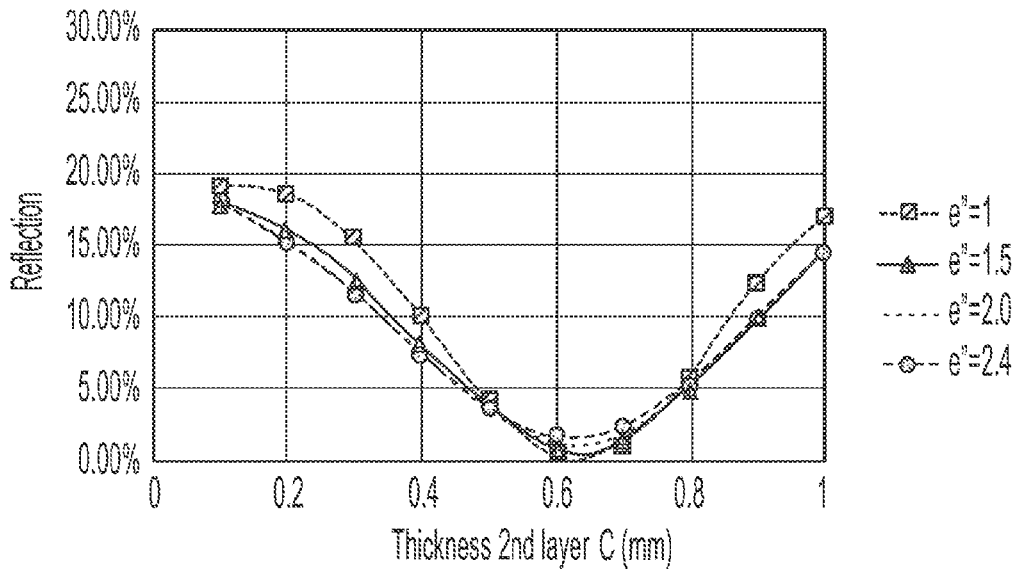
Figure 12D:
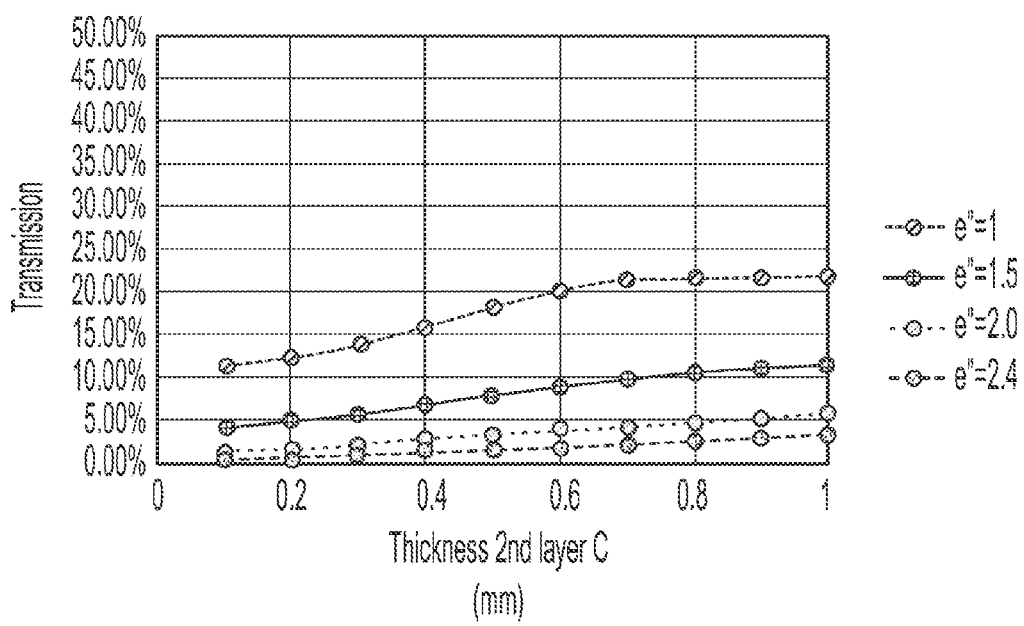
Figure 12E:
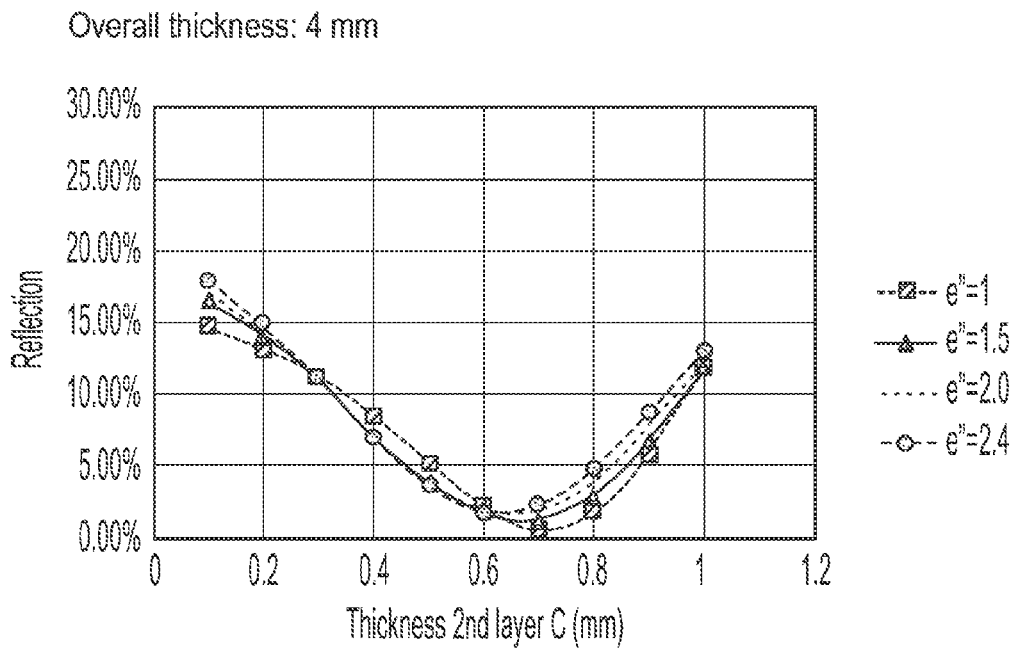
Figure 12F:
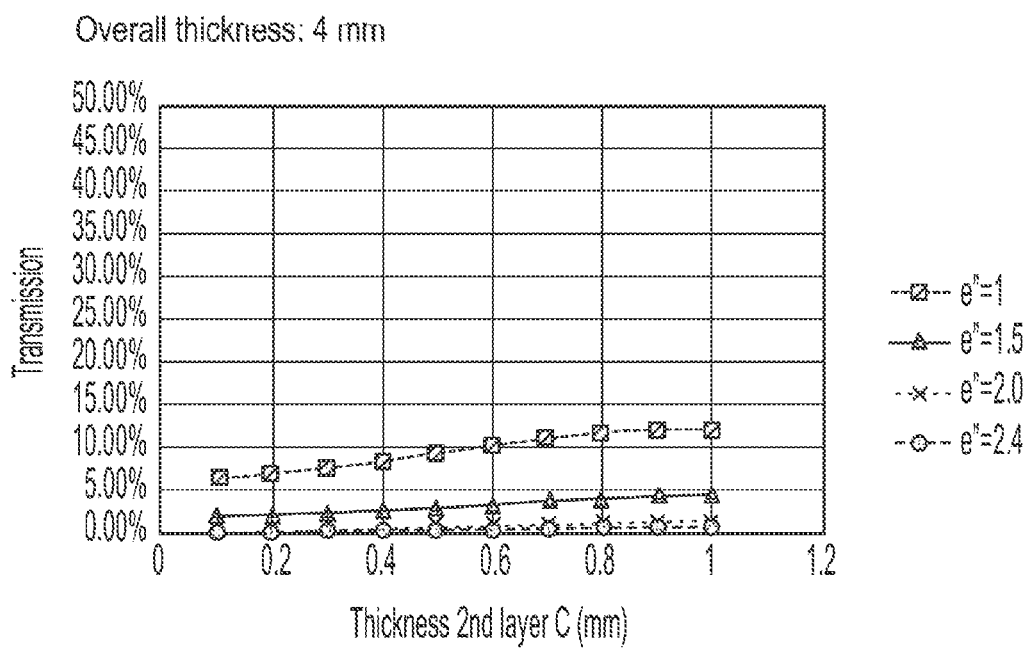

In general, a reflection of less than 15% is met relatively easily, particularly with a second layer (layer C) thickness of 0.3 mm to 0.7 mm. It was more difficult to achieve transmission values of less than 6% at a 2 mm overall wall thickness. A transmission value of less than 6% was only met with a bottom layer material having a higher ε" or loss factor. FIGS. 11A and 11B shows the transmission as a function of ε"; only solutions where ε" was greater than 2.4 was apparent (FIG. 11B features a magnified Y-axis). Thus, using a bottom layer having a higher ε" decreased transmission.

Generally, with decreasing wall thickness a higher ε" is required but with increasing wall thickness, a first layer (layer A) having a lower ε" can also provide a solution. This was demonstrated in FIGS. 12A-12F for a molded part having a second layer (layer C) with a Dk of 2 and Df of 0.001, and a first layer (layer A) having a Dk of 6 and a varying ε". As can be inferred, at 2 mm (and regardless of the thickness of the second layer), none of the combinations exhibited a reflection less than 15% and a transmission less than 6%. Increasing the overall thickness to 3 mm then provided solutions if the ε" of the first layer (layer A) was 2.0 or higher. Further increasing the overall thickness to 4 mm now showed that the requirements of low reflection and low transmission can be met even where the ε" of the first layer (layer A) is 1.5.

Figure 13A:
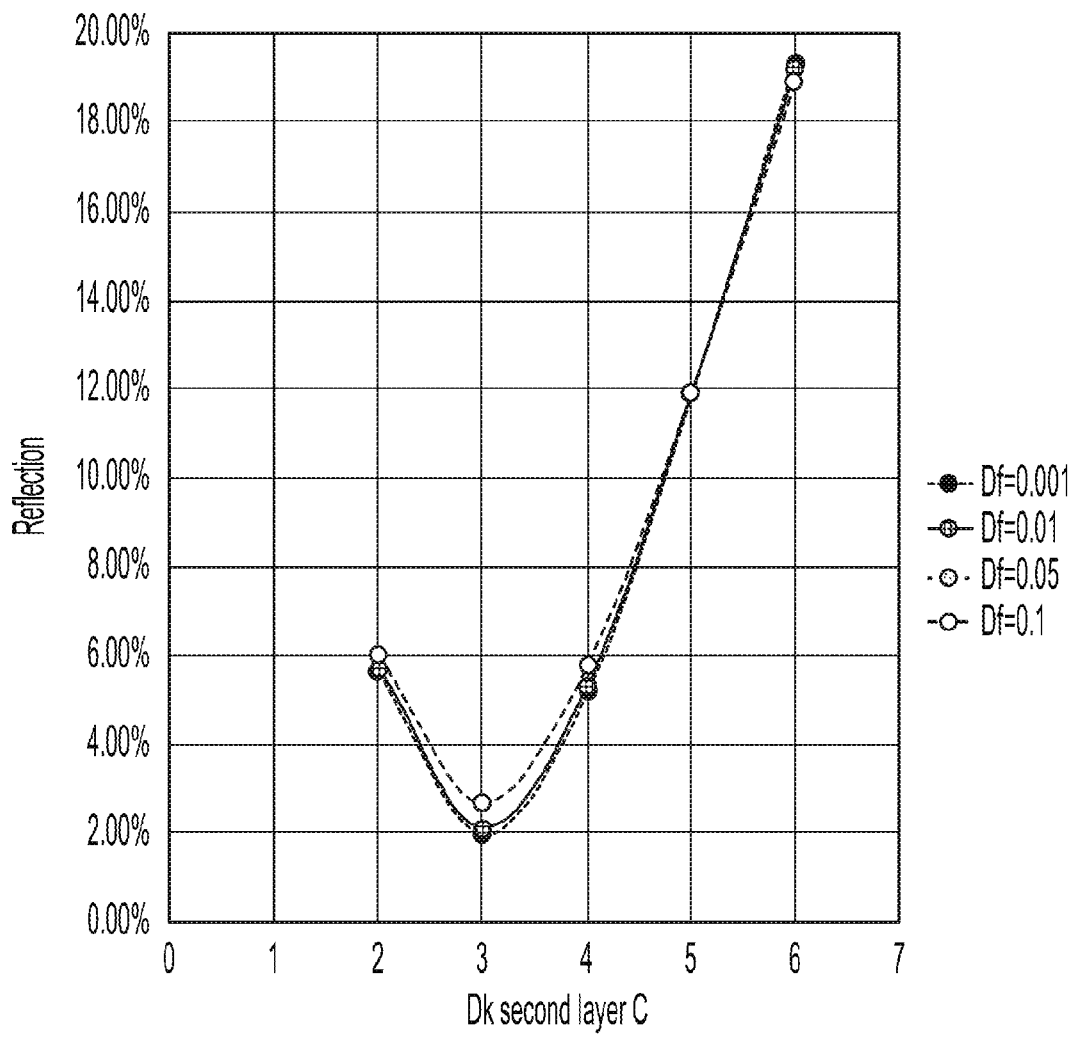
FIGS. 13A and 13B are graphical representations of the reflection as a function of the dielectric constant for 0.4 mm second (top) layer and 1.6 mm first layer multilayer parts having a first layer Dk of 6/Df of 0.4 and Dk of 10/Df of 0.5, respectively.
Figure 13B:
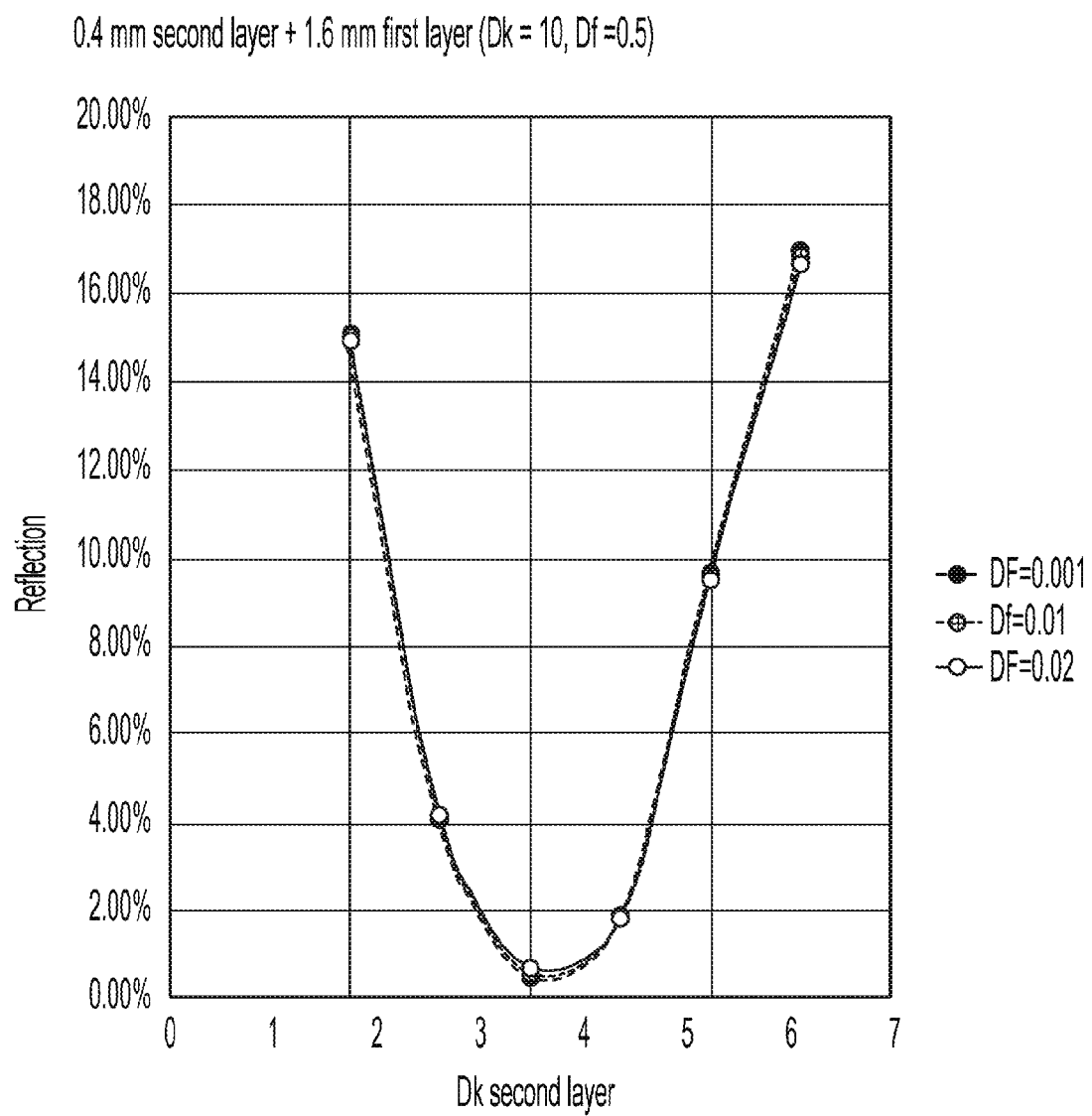

Initial analyses of the calculations performed showed that the reflection was mainly determined by the Dk of the second layer C material. Df of the second layer material had little or no influence on the reflectivity as shown in FIG. 13A and FIG. 13B. Furthermore, the data demonstrated that the mismatch between the Dk of the second layer (layer C) and first layer (layer A) can significantly affect reflection. To provide a multilayered part with a reflection less than 15%, a $Dk_{2nd\ layer}/Dk_{1st\ layer}$ ratio of from about 0.2 to 0.6 provided the best results.

Given the results observed, reflection was primarily controlled by the Dk of the top layer material. The lowest values for reflection were obtained with a 0.3 mm to 0.7 mm thickness second layer C with $Dk_{2nd\ layer}/Dk_{1st\ layer}$ ratios between 0.2 and 0.6. Transmission—was primarily determined by the ε" of the bottom layer material and the overall thickness. For 4 mm overall thickness, first layer (layer A) materials having a ε" greater than 1; for 3 mm overall thickness, first layer (layer A) materials having a ε" greater than 1.5, and for 2 mm overall thickness, first layer (layer A) materials having a ε" greater than 2.4 performed best.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual-layer part consisting of:
   a first layer having a thickness greater than 0.8 mm, wherein the first layer consists of a first polymer composition consisting of at least a first polymer and from about 0.1 wt. % to about 30 wt. % of a first electrically conductive carbon-based filler component;
   a second layer disposed adjacent a surface of the first layer, wherein the second layer consists of a second polymer composition consisting of at least a second polymer and from about 0.01 wt. % to about 3 wt. % of a second electrically conductive carbon-based filler component,
   wherein a ratio of a thickness of the first layer to the second layer is from 1:1 to 20:1,
   wherein the first electrically conductive carbon-based filler component consists of a different filler or combination of fillers than the second electrically conductive carbon-based component,
   wherein the dual-layer part exhibits a percent reflected power measured in transmission mode of less than 15% and a percent transmitted power less than 6% when observed according to a Free Space method at frequencies of from about 77 GHz to 81 GHz when the dual layer part is oriented such that microwave radiation is incident to the second layer of the dual-layer part,
   wherein the dielectric constant (Dk) of the second layer is 2 to 5 and wherein the ratio of a Dk of the second layer to a Dk of the first layer ($Dk_{2nd\ layer}/DK_{1st\ layer}$) is from 0.2 to 0.6 when tested on molded samples of the first polymer of the first layer and the second polymer of the second layer respectively using a split post dielectric resonator (SPDR) and network analyzer at fixed frequencies, and
   wherein the combined weight percent value of all components does not exceed 100 wt. %, and all weight percent values are based on the total weight of the first or second polymer compostion.

2. The dual-layer part according to claim 1, wherein the second layer has a thickness less than 0.8 mm.

3. The dual-layer part according to claim 1, wherein the second layer has a thickness of from about 0.2 mm to about 0.7 mm.

4. The dual-layer part according to claim 1, wherein the dual-layer part has an overall thickness of up to about 6 mm.

5. The dual-layer part according to claim 1, wherein the first polymer or second polymer consists of a polyester, a polycarbonate, a polyamide, a polyphenylene ether, a polypropylene, or a combination thereof.

6. The dual-layer part according to claim 5, wherein the first polymer or the second polymer consists of a polyester.

7. The dual-layer part according to claim 1, wherein the amount of the first electrically conductive carbon-based filler component in the first layer is greater than the amount of the second electrically conductive carbon-based filler component in the second layer.

8. The dual-layer part according to claim 1, wherein the first electrically conductive carbon-based filler component and the second electrically conductive carbon-based filler component each independently consist of carbon fibers, carbon powder, graphite, graphene, carbon platelets, carbon nanotubes, or a combination thereof.

9. The dual-layer part according to claim 1, wherein the dual-layer part is formed by a two component (2K) injection molding process.

10. The dual-layer part according to claim 1, wherein a ratio of a Dk of the second layer to a Dk of the first layer ($Dk_{2nd\ layer}/Dk_{1st\ layer}$) is from 0.2 to 0.6 when tested on molded samples of the first polymer of the first layer and the second polymer of the second layer respectively using a split post dielectric resonator (SPDR) and network analyzer at 77 GHz.

11. The dual-layer part according to claim 1, wherein the first electrically conductive carbon-based filler component consists of carbon powder and carbon nanotubes, and the second electrically conductive carbon-based filler component consists of carbon powder.

* * * * *